United States Patent
Lipke et al.

(10) Patent No.: US 9,551,454 B2
(45) Date of Patent: Jan. 24, 2017

(54) DEVICE HOLDER

(71) Applicants: Dean Lipke, Mill Creek, WA (US);
Charles Bragg, Bothell, WA (US)

(72) Inventors: Dean Lipke, Mill Creek, WA (US);
Charles Bragg, Bothell, WA (US)

(73) Assignee: LEVITON MANUFACTURING CO., INC., Melville, NY (US)

(*) Notice: Subject to any disclaimer, the term of this patent is extended or adjusted under 35 U.S.C. 154(b) by 279 days.

(21) Appl. No.: 13/649,649

(22) Filed: Oct. 11, 2012

(65) Prior Publication Data
US 2014/0103179 A1    Apr. 17, 2014

(51) Int. Cl.
*H01R 13/72* (2006.01)
*F16M 13/02* (2006.01)
*H02G 3/14* (2006.01)
*F16M 11/04* (2006.01)
*F16M 13/00* (2006.01)
*H02J 7/00* (2006.01)

(52) U.S. Cl.
CPC ............ *F16M 13/02* (2013.01); *F16M 11/041* (2013.01); *F16M 13/00* (2013.01); *H01R 13/72* (2013.01); *H02G 3/14* (2013.01); *H02J 7/0044* (2013.01); *Y10T 29/49117* (2015.01); *Y10T 29/49826* (2015.01)

(58) Field of Classification Search
CPC ............ A47F 5/00; A47F 13/73; A47F 13/60; A47F 13/62; A47F 13/74; H02G 3/14; H02G 3/081; H02G 3/185; H02G 3/20; B60R 7/005; H01R 25/006; H04M 1/0297; H04M 1/04

USPC ..... 174/66, 67; 439/501, 516, 528; 220/541, 220/242
See application file for complete search history.

(56) References Cited

U.S. PATENT DOCUMENTS

| | | | | |
|---|---|---|---|---|
| 2,943,138 A | * | 6/1960 | Reager | 174/66 |
| 3,013,105 A | * | 12/1961 | Craig | 174/67 |
| 3,113,996 A | * | 12/1963 | Sanford | 174/67 |
| 3,200,989 A | * | 8/1965 | Hubbell | 220/242 |
| 3,473,859 A | * | 10/1969 | Kircher | 312/209 |
| 3,634,598 A | * | 1/1972 | Stanfield | H02G 3/088 174/51 |
| 3,659,037 A | * | 4/1972 | MacDonald | H02G 3/123 174/58 |
| 3,689,868 A | * | 9/1972 | Snyder | 439/501 |
| 3,710,224 A | * | 1/1973 | Daniels | 320/115 |
| 3,838,383 A | * | 9/1974 | Wilbur et al. | 439/472 |
| 3,955,870 A | * | 5/1976 | Wasserman | 439/144 |
| 4,109,252 A | * | 8/1978 | Hacker | H01Q 1/3258 248/539 |
| 4,425,725 A | * | 1/1984 | Moustakas et al. | 40/725 |
| 4,536,694 A | * | 8/1985 | McCarty et al. | 320/111 |
| 4,702,709 A | * | 10/1987 | Santilli | 439/144 |
| 4,921,444 A | * | 5/1990 | Cama | 439/528 |

(Continued)

*Primary Examiner* — Nkeisha Smith
(74) *Attorney, Agent, or Firm* — Amin, Turocy & Watson, LLP

(57) ABSTRACT

An electronic device holder is provided. In one aspect, a strap or a back plate, such as a molded plastic strap, is provided to facilitate holding an electronic device. In another aspect, a device cradle is provided that can hold an electronic device and facilitate retention and management of associated device cables. In another aspect, the strap or back plate can comprise a set of connector stations that conform to a standardized form-factor, wherein the connector stations are adapted to accept a standardized insert.

37 Claims, 38 Drawing Sheets

(56) References Cited

U.S. PATENT DOCUMENTS

| | | | | |
|---|---|---|---|---|
| 5,075,615 | A * | 12/1991 | Dantis | 320/111 |
| 5,239,610 | A * | 8/1993 | Shao | 392/363 |
| 5,539,821 | A * | 7/1996 | Blonder | 379/446 |
| 5,651,696 | A * | 7/1997 | Jennison | 439/536 |
| D396,160 | S * | 7/1998 | Huang | D6/567 |
| D405,347 | S * | 2/1999 | Mezey | D8/353 |
| 5,877,450 | A * | 3/1999 | Quin | 174/66 |
| 5,961,016 | A * | 10/1999 | Hartmann et al. | 224/571 |
| 6,036,536 | A * | 3/2000 | Chiu | 439/536 |
| 6,065,728 | A * | 5/2000 | Spradlin | 248/309.1 |
| 6,130,384 | A * | 10/2000 | Esteves et al. | 174/66 |
| 6,422,898 | B1 * | 7/2002 | Harvey et al. | 439/536 |
| 6,503,097 | B2 * | 1/2003 | Archambault | H01R 13/60 439/4 |
| 6,729,485 | B2 * | 5/2004 | Ehrgott | A47F 5/0823 211/189 |
| 6,806,425 | B1 * | 10/2004 | O'Neill | 174/66 |
| 6,901,779 | B2 * | 6/2005 | Magee et al. | 70/63 |
| 6,938,867 | B2 * | 9/2005 | Dirks | 248/314 |
| 6,969,803 | B1 * | 11/2005 | Friedberg | 174/66 |
| 7,048,222 | B1 * | 5/2006 | Curtiss | 242/405.1 |
| 7,067,737 | B2 * | 6/2006 | Mallen | 174/66 |
| D529,489 | S * | 10/2006 | Sbordon, Jr. | D14/253 |
| 7,172,456 | B1 * | 2/2007 | Nagy | 439/501 |
| 7,193,305 | B1 * | 3/2007 | Miks | H01L 23/49811 257/676 |
| 7,230,181 | B2 * | 6/2007 | Simmons et al. | 174/66 |
| D549,171 | S * | 8/2007 | Sbordon, Jr. | D13/108 |
| 7,255,588 | B2 * | 8/2007 | Wilder | 439/373 |
| 7,271,339 | B2 * | 9/2007 | Dinh | 174/66 |
| 7,374,454 | B1 * | 5/2008 | Wang | 439/536 |
| 7,528,323 | B2 * | 5/2009 | Wu et al. | 174/66 |
| 7,563,979 | B1 * | 7/2009 | Gretz | 174/66 |
| 7,674,975 | B2 * | 3/2010 | Atkinson et al. | 174/66 |
| 7,683,257 | B1 * | 3/2010 | Shotey et al. | 174/66 |
| 7,812,257 | B2 * | 10/2010 | Gunderman et al. | 174/66 |
| 7,980,580 | B2 * | 7/2011 | Loewenthal | A61G 5/12 248/230.1 |
| 8,143,520 | B2 * | 3/2012 | Cutler | 174/66 |
| 8,203,077 | B2 * | 6/2012 | Honeycutt et al. | 174/66 |
| 8,242,364 | B1 * | 8/2012 | Shotey et al. | 174/66 |
| 8,490,815 | B2 * | 7/2013 | Provenzano et al. | 220/241 |
| 8,864,517 | B2 * | 10/2014 | Cohen | 439/536 |
| 2006/0276077 | A1 * | 12/2006 | Mori | 439/538 |
| 2007/0111586 | A1 * | 5/2007 | Wilder | 439/373 |
| 2007/0275595 | A1 | 11/2007 | Hazani et al. | |
| 2008/0165490 | A1 * | 7/2008 | Buckland | G11B 33/128 361/679.33 |
| 2008/0245546 | A1 * | 10/2008 | Sutter | 174/66 |
| 2009/0156054 | A1 * | 6/2009 | Wang | 439/527 |
| 2011/0070773 | A1 * | 3/2011 | Wirtz | 439/527 |
| 2011/0132634 | A1 * | 6/2011 | Fetzer-Westmeister | 174/66 |
| 2011/0186326 | A1 * | 8/2011 | Wang | 174/66 |
| 2014/0166333 | A1 * | 6/2014 | Porcano | 174/66 |

\* cited by examiner

DEVICE HOLDER

FIELD OF THE INVENTION

The subject disclosure is directed to organizing and storage of electronic devices and, more specifically, relates to structures, articles of manufacture, devices, systems, and methods that facilitate holding, storing, organizing, and utilizing electronic devices.

BACKGROUND OF THE INVENTION

Modern life is filled with electronic devices. Cellular phones, music players, video players, digital cameras, global positioning system (gps) devices, radios, handheld gaming devices, etc., all offer tremendous convenience. However, these and other electronic device each come with an array of chargers, charging cables, data cables, and so on that can become a nightmare to keep track of. As a result, the user can often become frustrated by lost cables, inconvenient locations for charging their devices, and an unsightly rat's nest of the myriad of cables required to keep the user's devices operating. For instance, considerations such as how long of a cord a user would need to have to charge his or her electronic device, would the electronic device just dangle from the power supply, would the electronic device be sitting on a table or a shelf, and so on are constant considerations to accommodate the requirements of various electronic devices.

In addition, an increasing availability of structured cable products and home entertainment, networking, and automation products have presented new ways to take advantage of many of the electronic devices of modern life. For instance, it is increasingly common that new homes are built with the ability to transmit or receive information including audio, video, data, voice, from virtually any room in the house, whereas in years past, such mundane offerings as telephone and cable television were considered an afterthought. As a result, users have begun to demand more convenient and flexible ways to consume their digital media (e.g., music, movies, pictures, etc.), and for which demand conventional products have only offered a patchwork of potential solutions.

It is thus desired to provide structures, articles of manufacture, devices, systems, and methods that improve upon these and other deficiencies.

SUMMARY OF THE INVENTION

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

Structures, articles of manufacture, devices, systems, and methods are provided for holding an electronic device. In one aspect, a molded plastic strap or a back plate is provided to facilitate holding an electronic device. In another aspect, a device cradle is described that can hold an electronic device and facilitate management or organization of associated device cables. In addition, various embodiments can comprise electronics and connectors, such as converters, for example, adapted to convert line voltage to a Universal Serial Bus (USB) standard voltage, or other peripheral or device connection standard voltage, to facilitate one or more of connecting or charging an electronic device. Various non-limiting implementations are described as well as possible alternatives.

Thus, in various embodiments, the disclosed subject matter provides a strap or back plate adapted to fit into an unused station of a wallplate from a back side of the wallplate, and which can be employed with or without a junction box and/or without upgrading or installing equipment or infrastructure within a wall or other mounting surface. In an aspect, a device cradle can be mounted to the strap or back plate and can be removed as desired.

In other embodiments, the disclosed subject matter provides a device cradle adapted to hold an electronic device proximate to one or more of an electrical outlet, a switch, or a control device, and which device cradle can be adapted to manage or organize one or more of a power cable, a data cable, or a signal carrying cable associated with the electronic device. In addition, exemplary implementations of a device cradle can include one or more attachment mechanism(s) on the device cradle adapted to allow removable attachment (e.g., attachment and removal) of the device cradle to the wallplate.

These and other additional features of the disclosed subject matter are described in more detail below.

BRIEF DESCRIPTION OF THE DRAWINGS

The articles of manufacture, devices, components, assemblies, structures, systems and/or methodologies of the disclosed subject matter are further described with reference to the accompanying drawings in which.

DETAILED DESCRIPTION OF ILLUSTRATIVE EMBODIMENTS

Overview

As used herein, the terms "device" or "electronic device" are intended to be used broadly and inclusively to include such illustrative devices as, without limitation, cellular phones, smart phones, personal digital assistants (PDAs), portable audio players, mpeg level three (mp3) audio players, digital cameras, digital video cameras, portable gaming devices, handheld electronics, scanners, rechargeable electronic devices, and any and all other electronic devices suitable for use with the various non-limiting embodiments of the disclosed subject matter. It can be further understood that the term "standardized" in reference to the terms "standardized insert" and "standardized form-factor" are intended to refer to the characteristic that a number of inserts can share and some similarities in physical dimensions that facilitate installation of the inserts in connector stations having complementary physical dimensions (e.g., are of a standardized form-factor). Thus, in that context, it should be understood that the use of such terms does not necessarily connote acceptance and use by a particular standards-governing body nor does the use of such terms necessarily exclude such connotations.

Figure 1:
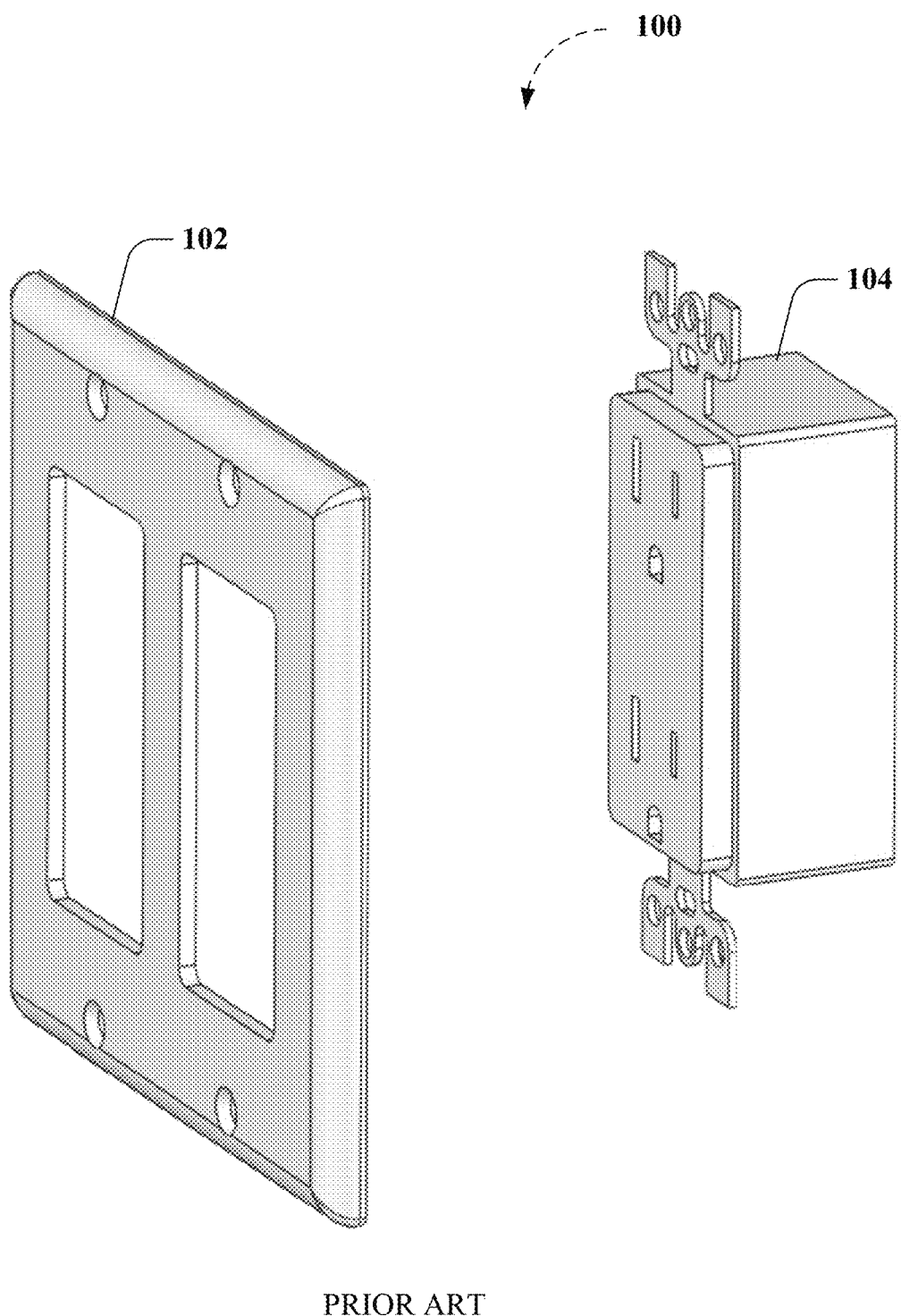
FIG. 1 depicts an exploded view of an exemplary prior art dual gang wallplate and a single gang receptacle assembly, suitable for use with various embodiments of the disclosed subject matter.
Figure 2:
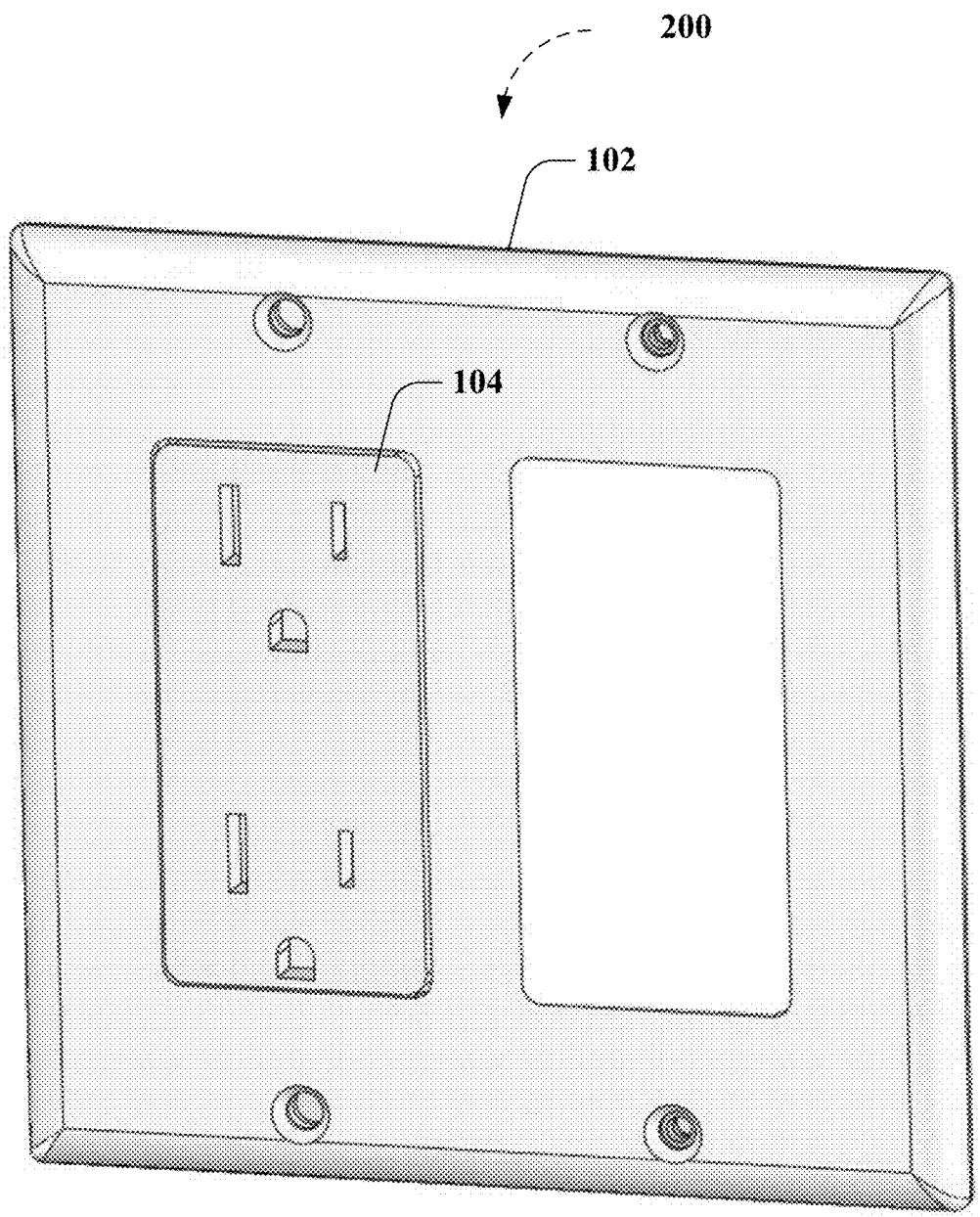
FIG. 2 depicts an exemplary prior art dual gang wallplate and a single gang receptacle assembly, suitable for use with various embodiments of the disclosed subject matter.

As described in the background, it is desired to provide structures, articles of manufacture, devices, systems, and methods for holding electronic devices, as can be seen in FIGS. 1-2, which provide additional context surrounding the embodiments of the disclosed subject matter. For example, FIG. 1 depicts an exploded view 100 of an exemplary prior art dual gang wallplate 102 and a single gang receptacle 104 assembly, suitable for use with various embodiments of the disclosed subject matter. For instance, FIG. 1 depicts a conventional Leviton® Decora® dual gang wall plate 102 and a corresponding single gang Decora® receptacle 104.

Typically, a wallplate 102 for a corresponding junction box is sized to fit the junction box (not shown) located or installed in an existing wall or mounting surface of an enclosure, such as a cabinet, and so on. That is, the wallplate 102 and a corresponding junction box have the same number of stations or locations for devices (e.g., receptacles 104, switches, controls, etc.). As an example, if a dual gang junction box is installed in a wall or mounting surface, a dual gang wall plate 102 would be used as a fascia to finish the installation of electrical controls, outlet receptacles 104, etc. In other words, a dual gang junction box would comprise two stations for installing two single gang devices (e.g., single gang switches, receptacles 104, etc.) or one dual gang device. Thus, to finish a typical installation, a wallplate 102 (e.g., a dual gang wall plate 102 or other wallplate 102 conventionally sized for the junction box, etc.) comprising the same number of stations as the junction box used. It can be understood that types and numbers of devices installed in the junction boxes can necessitate variation in the types (e.g., whether outlet, switches, controls, and/or blank stations, etc.) and numbers of stations in the corresponding wallplate 102. FIG. 2 depicts an exemplary prior art dual gang wallplate 102 and a single gang receptacle 104 assembly 200, suitable for use with various embodiments of the disclosed subject matter.

Thus, in various embodiments, the disclosed subject matter provides a strap or back plate (e.g., such as strap or back plate (302, 306), and so on, as described below, etc.) adapted to fit into an unused station of a wallplate 102 (e.g., from a back side of the wallplate 102, etc.) and which can be employed with or without a junction box and/or without upgrading or installing equipment or infrastructure within a wall or other mounting surface. In an aspect, a device cradle (e.g., such as device cradle (304, 308), and so on, as described below, etc.) can be mounted to the strap or back plate (e.g., strap or back plate (302, 306), and so on, etc.) and can be removed as desired.

Accordingly, in a further non-limiting aspect, the disclosed subject matter provides articles of manufacture that are modular in design and application. For example, variations in form or characteristic of a device cradle, such as described below regarding FIGS. 3-4, 9-10, 19-20, 32-33, etc., for instance, can be employed with a strap or back plate according to an intended application or characteristic (e.g., what device is to be held, what aesthetic features or finishes are desired, etc.). In yet another non-limiting example, a form of a device cradle can be employed that is adapted to hold or support a number of disparate devices (e.g., cellular phones, digital audio players, etc.) rather than specifically targeted to hold a specific form of electronic device to the exclusion of other electronic devices. In other non-limiting aspects, various embodiments of the disclosed subject matter can be employed in a non-permanent, reversible, and/or non-damaging installation. For instance, as further described herein, by allowing expansion of the available stations with a wallplate 102 at an installed junction box (e.g. a junction box having a device, such as a wall switch, outlet, etc.), it can be understood that the wallplate 102 can be subsequently removed without causing cosmetic damage or other permanent impact to the integrity of the wall (e.g., such as by addition of a larger junction box, installation of the wallplate 102 without a junction box, etc.).

Figure 3:
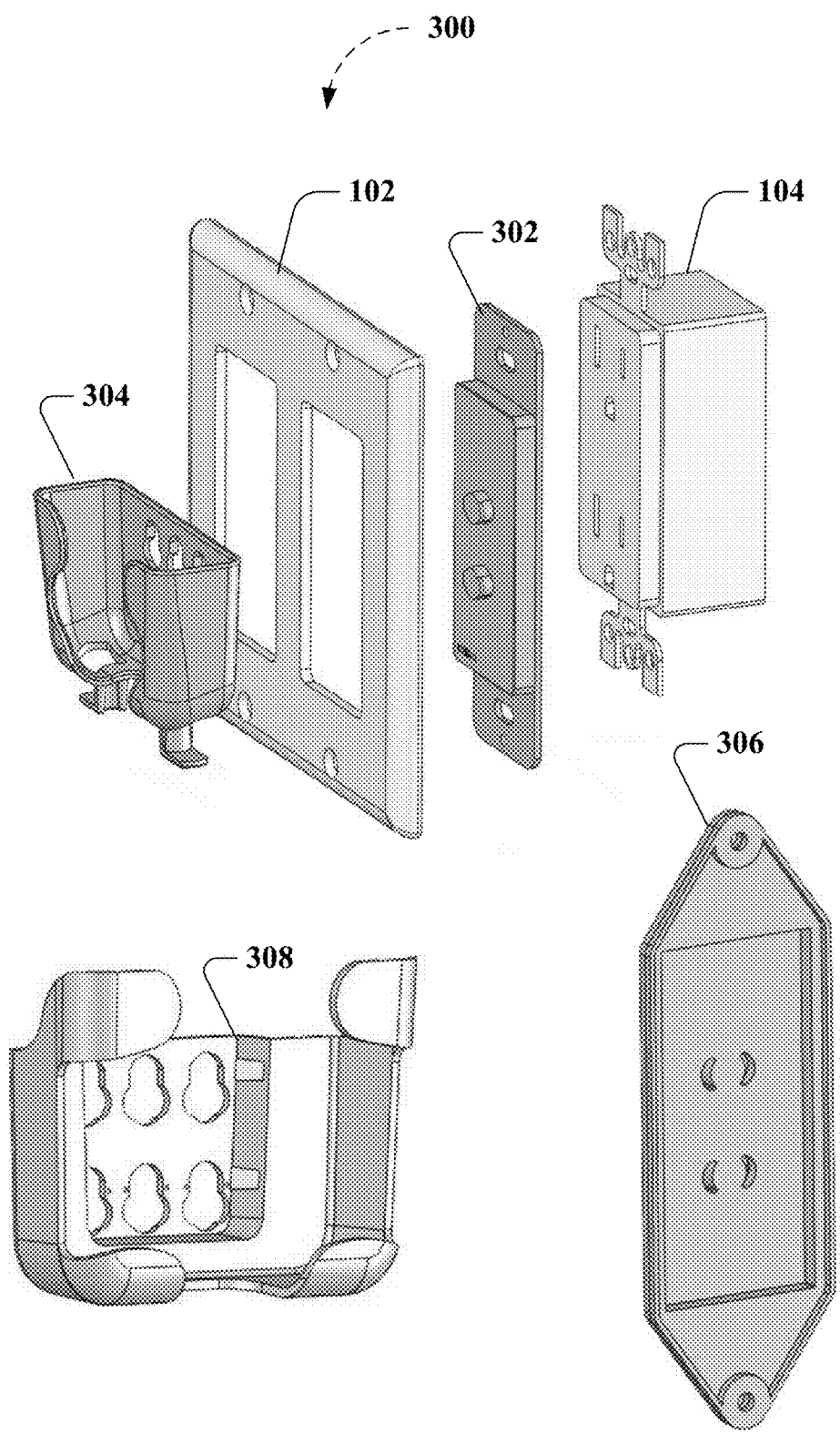
FIG. 3 depicts an exploded view of an exemplary dual gang wallplate and a single gang receptacle assembly with various non-limiting implementations of the disclosed subject matter.

Various embodiments of the disclosed subject matter can employ wallplates 102 having one or more additional stations as compared to that of a junction box, for which the wallplate 102 is to be installed, to facilitate holding an electronic device. For instance, FIG. 3 depicts an exploded view of an exemplary dual gang wallplate 102 and a single gang receptacle 104 assembly 300 with various non-limiting implementations of the disclosed subject matter as further described herein. For instance, FIG. 3 depicts exemplary non-limiting implementations of a strap or back plate (302, 306) and exemplary non-limiting implementations of a device cradle (304, 308), according to aspects the disclosed subject matter as further described herein. Exemplary implementations of a strap or back plate (302, 306) can comprise rigid or semi-rigid moldable or formable parts including molded plastic, metallic structures, and so on and combinations thereof. In further non-limiting implementations of a strap or back plate (302, 306), the strap or back plate (302, 306) can be adapted to fit a standardized wallplate 102 form factor (e.g., such as Leviton® Decora® wallplate 102 form factor, etc.). Additional exemplary implementations of a strap or back plate (302, 306) can facilitate providing various matching colors and/or ornate designs to keep with a design theme such as in a Leviton® Decora® line of designs, for example.

Thus, in various embodiments, the disclosed subject matter provides one or more strap(s) or back plate(s) (e.g., strap(s) or back plate(s) 302, 306, etc.) and one or more device cradle(s) (e.g., device cradle(s) 304, 308, etc.), as further described herein.

Exemplary Device Holders

Figure 4:
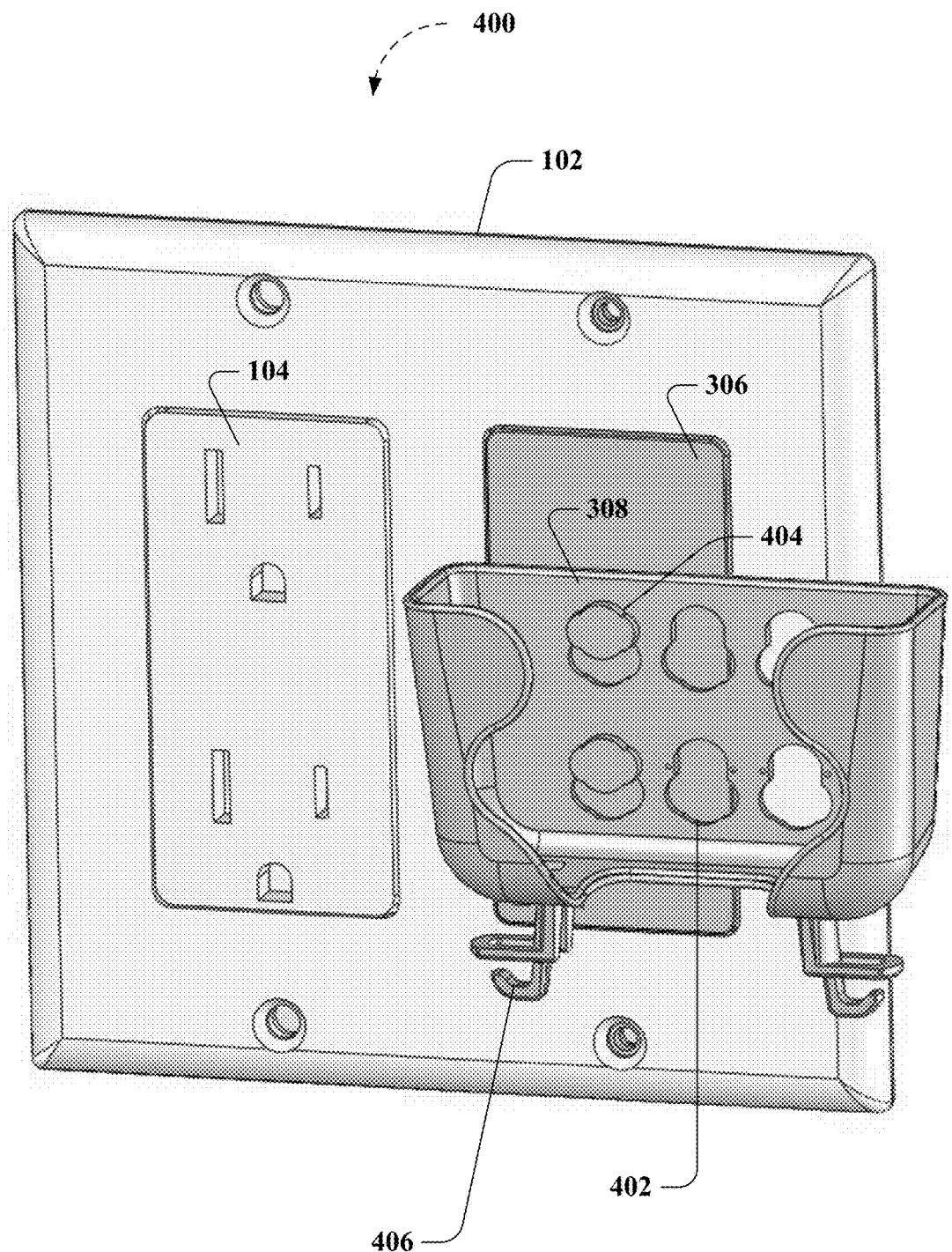
FIG. 4 depicts an exemplary dual gang wallplate and a single gang receptacle assembly demonstrating various aspects of non-limiting implementations of the disclosed subject matter.

FIG. 4 depicts an exemplary dual gang wallplate 102 and a single gang receptacle 104 assembly 400 demonstrating various aspects of non-limiting implementations of the disclosed subject matter. For instance, exemplary non-limiting implementations of the disclosed subject matter can include articles of manufacture comprising a molded plastic strap (e.g., strap or back plate (302, 306), and so on, etc.) adapted to fit into an unused station of a wallplate 102 (e.g., a station that, when the wallplate 102 is installed on a junction box, would not correspond to a station on the junction box, a station on a wallplate 102 installed on a wall or mounting surface without a junction box, etc.) from a back side of the wallplate 102, a first attachment mechanism adapted to align and attach the molded plastic strap to the wallplate 102, and one or more second attachment mechanism(s) (e.g., second attachment mechanism(s) 404, etc.) adapted to attach the molded plastic strap (e.g., strap or back plate (302, 306), and so on, etc.) to a device cradle (e.g., device cradle (304, 308), and so on, etc.).

For example, the first attachment mechanism can comprise any of a number of attachment mechanisms adapted to align and attach the molded plastic strap (e.g., strap or back plate (302, 306), and so on, etc.) to the wallplate 102. For instance, the first attachment mechanism can comprise a snap-fitting mechanism, a latching mechanism, an interference fitting plug and corresponding hole, a clasp mechanism, a contacting surface adapted to receive a removable or non-removable adhesive and further adapted to engage a corresponding contacting surface, a threaded hole and a corresponding screw or bolt, etc. In a further non-limiting example, one or more threaded hole(s) that can accept one or more fastener(s) inserted through the wallplate 102 (e.g., machine screws similar to that used to mount the wallplate 102 to the junction box, the device mounted in the junction box (e.g., switch, receptacle 104, dimmer switch, volume control, etc.)). In a further non-limiting aspect, the first attachment mechanism can further comprise a raised portion of the molded plastic strap (e.g., strap or back plate (302, 306), and so on, etc.) that can be inserted into a recessed mating portion of the wallplate 102 (e.g., such as a Leviton® Decora® wallplate 102, etc.) or a raised mating portion of the wallplate 102 that can be inserted into a recessed portion of the molded plastic strap (e.g., strap or back plate (302, 306), and so on, etc.).

In addition, further non-limiting embodiments of the disclosed subject matter can include the one or more second attachment mechanism(s) (e.g., second attachment mechanism(s) 404, etc.), which can be adapted to facilitate attachment and removal of the device cradle (e.g., device cradle (304, 308), and so on, etc.) as desired for holding the electronic device, such as by including removable attaching mechanisms (e.g., screws, clips, latches, slots, pegs, pins, etc.). As an illustrative example, the one or more second attachment mechanism(s) can comprise one or more slot(s) on the molded plastic strap (e.g., strap or back plate (302, 306), and so on, etc.) and one or more complementary peg(s) on the device cradle (e.g., device cradle (304, 308), and so on, etc.). In a further non-limiting example, the second attachment mechanism can comprise one or more slot(s) 402 on the device cradle (e.g., device cradle (304, 308), and so on, etc.) and one or more complementary peg(s) 404 on the molded plastic strap (e.g., strap or back plate (302, 306), and so on, etc.).

In still other non-limiting implementations, the device cradle (e.g., device cradle (304, 308), and so on, etc.) can be further configured with a cable management portion (e.g., cable management portion 406, and so on, etc.) as described herein adapted to manage or retain one or more of a power cable, a data cable, and/or a signal carrying cable associated with the electronic device, for example.

Moreover, as further described below, various embodiments of the disclosed subject matter can further comprise electronics and/or connectors, such as converters, for example, adapted to convert line voltage (e.g., United States standard 60 Hertz (Hz), 120 Volts Alternating Current (VAC) line voltage, other standard line voltage, etc.) to a Universal Serial Bus (USB) standard voltage (e.g., +5 Volts Direct Current (DC), etc.) or other standard peripheral connection standard voltage, to facilitate one or more of connecting or charging an electronic device.

In further exemplary implementations, the disclosed subject matter provides articles of manufacture comprising a back plate (e.g., strap or back plate (302, 306), and so on, etc.) adapted to fit into a station of a wallplate 102 from a back side of the wallplate 102. In addition, the back plate (e.g., strap or back plate (302, 306), and so on, etc.) can be adapted to fasten to the wallplate 102 and to accept a device cradle (e.g., device cradle (304, 308), and so on, etc.) positioned on the front side of the wallplate 102. Moreover, the back plate (e.g., strap or back plate (302, 306), and so on, etc.) can be further configured to allow the wallplate 102 and the fastened back plate (e.g., strap or back plate (302, 306), and so on, etc.) to be mounted flush with the plane of a mounting surface absent an empty junction box station to accommodate the back plate (e.g., strap or back plate (302, 306), and so on, etc.). That is, the back plate (e.g., strap or back plate (302, 306), and so on, etc.) can be used to mount the device cradle (e.g., device cradle (304, 308), and so on, etc.) without requiring the use of a junction box. In other words, in particular non-limiting implementations, an assembly comprising a wallplate 102 and a fastened back plate (e.g., strap or back plate (302, 306), and so on, etc.) can be adapted to, or have dimensions that can facilitate the ability to, mount the assembly to a wall directly, without the need to mount to a junction box with an empty station, and/or without the need to cut a hole in the wall to accommodate the fastened back plate (e.g., strap or back plate (302, 306), and so on, etc.). Thus, as a further advantage, the back plate (e.g., strap or back plate (302, 306), and so on, etc.) can be used to mount the device cradle (e.g., device cradle (304, 308), and so on, etc.) without requiring the use of an empty junction box station, a junction box, or a hole in the wall to accommodate back plate (e.g., strap or back plate (302, 306), and so on, etc.) fastened to a wallplate 102. Thus, according to various embodiments, the disclosed subject matter can facilitate holding devices where no junction box exists, or where no stations in a junction box are available.

As a non-liming example, a dual or triple gang (and so on) wallplate 102 can be used with a single or dual gang junction box, respectively, to facilitate holding devices as described herein. In a further non-limiting example, a single, dual, or triple gang, (or greater) wallplate 102 can be used without a junction box or where fewer stations exist in the junction box than exist in the wallplate 102. In the former case, the wallplate 102 can be mounted directly to a wall or other mounting surface. In the latter case, the wallplate 102 can be mounted to the junction box with the excess wallplate 102 stations positioned strategically to allow a user to optimize the placement of cords, chargers, transformers (e.g., wall-warts, etc.). Thus, the various non-limiting implementations of the disclosed subject matter can be retrofitted to existing installations without the need to cut into the wall or mounting surface and without the need to install additional equipment within the wall or behind the mounting surface.

In addition, as mentioned above and as further described below, the articles of manufacture can further comprise electronics and connectors, such as converters, for example, adapted to convert a line voltage to a USB standard or other peripheral connection standard voltage to facilitate one or more of connecting or charging an electronic device.

Figure 5:
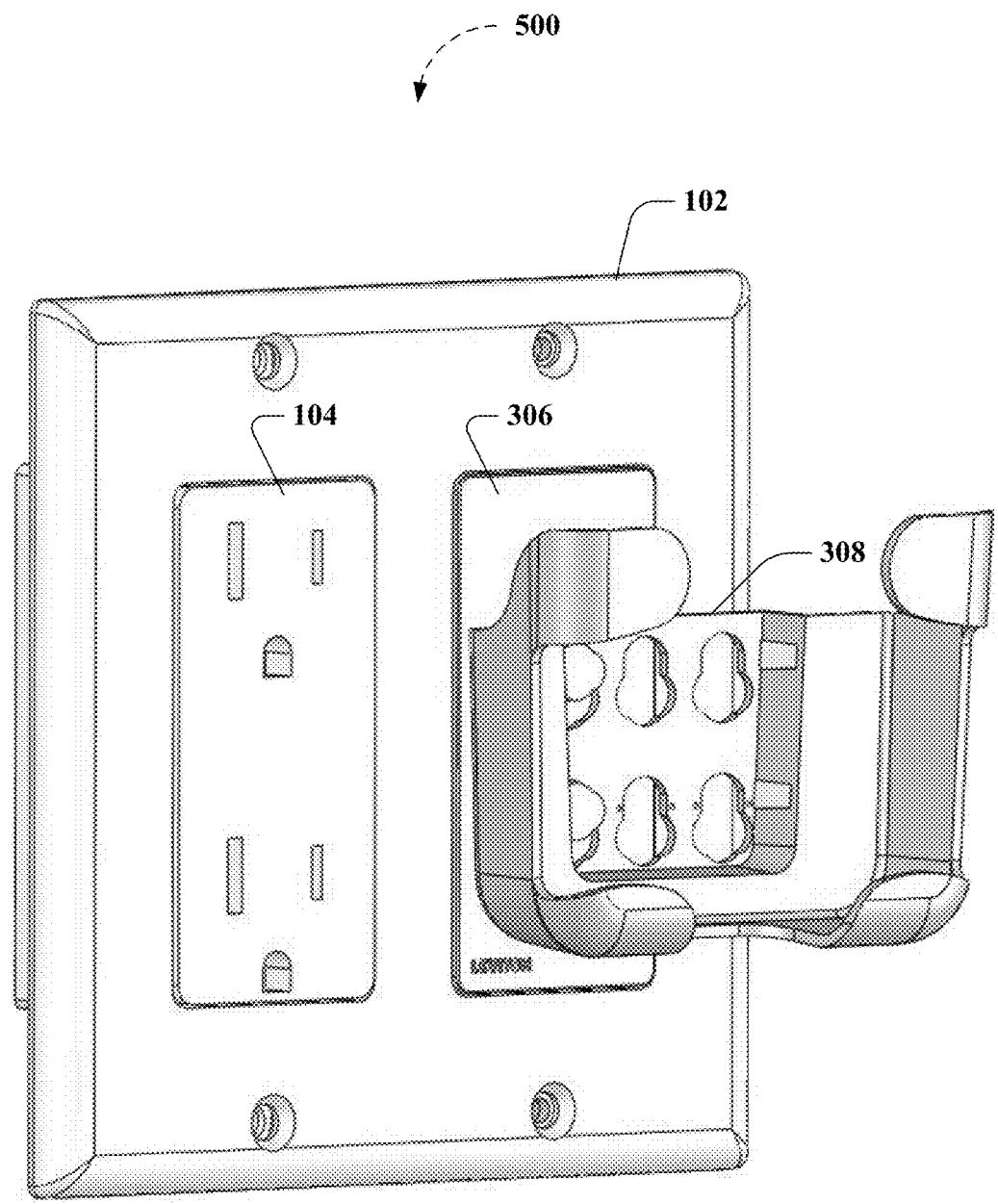
FIG. 5 depicts an exemplary dual gang wallplate and a single gang receptacle assembly demonstrating further aspects of non-limiting implementations of the disclosed subject matter.

FIG. 5 depicts an exemplary dual gang wallplate 102 and a single gang receptacle 104 assembly 500 demonstrating further aspects of non-limiting implementations of the disclosed subject matter. For example, according to various non-limiting embodiments, the disclosed subject matter can include articles of manufacture comprising a device cradle (e.g., device cradle (304, 308), and so on, etc.) that can be adapted to hold an electronic device proximate one or more of an electrical outlet, a switch, or a control device (e.g., a switch, a dimmer switch, a speed control, a charger, a volume control, etc.) and adapted to manage or organize one or more of a power cable, a data cable, or a signal carrying cable associated with the electronic device. As can be seen in FIG. 5 for example, in various non-limiting implementations a device cradle (e.g., device cradle (304, 308), and so on, etc.) can be further adapted to hold an electronic device in a desired orientation (e.g., vertical, centered in the cradle, off center from the strap or back plate (302, 306), suspended away from the wallplate 102 to allow cable storage behind the device, etc.). While various implementations are depicted and described herein with respect to particular implementations of a device cradle (e.g., device cradle (304, 308), and so on, etc.), it can be understood that the disclosed subject matter is not so limited.

In further non-limiting implementations, the articles of manufacture can comprise one or more attachment mechanism(s) on the device cradle (e.g., device cradle (304, 308), and so on, etc.) that can be adapted to allow attachment/removal of the device cradle (e.g., device cradle (304, 308), and so on, etc.) to/from the wallplate 102, such as by including removal and attachment mechanisms (e.g., screws, clips, latches, slots, pegs, pins, etc.). For instance, the one or more attachment mechanism(s) can further comprise one or more slot(s) on a back plate (e.g., strap or back plate (302, 306), and so on, etc.) adapted to attach to a back side of the wallplate 102 and one or more complementary peg(s) on the device cradle (e.g., device cradle (304, 308), and so on, etc.). In an additional non-limiting implementation, the one or more attachment mechanism(s) can further comprise one or more slot(s) 402 on the device cradle (e.g., device cradle (304, 308), and so on, etc.) and one or more complementary peg(s) 406 on a molded plastic strap (e.g., strap or back plate (302, 306), and so on, etc.) adapted to attach to a back side of the wallplate 102.

In yet other exemplary implementations, the one or more attachment mechanism(s) can comprise insulating prongs that can be adapted to be inserted into an electrical outlet and can further be adapted to hold the electronic device proximate the wallplate 102 by tension exerted by the electrical outlet, for example, similar to the manner in which a plug of an electrical cord is held in the electrical outlet. In a further non-limiting aspect, as further described herein, articles of manufacture according to the disclosed subject matter can further comprise electronics and connectors, such as converters, for example, adapted to convert line voltage to a USB standard voltage or other peripheral connection standard voltage to facilitate one or more of connecting or charging an electronic device. Moreover, the one or more attachment mechanism(s) of the various embodiments can comprise conducting prongs adapted to conduct voltage to the electronics and to hold the electronic device proximate the wallplate 102 by mechanical tension exerted by an electrical outlet or receptacle 104, such as further described herein.

Figure 6:
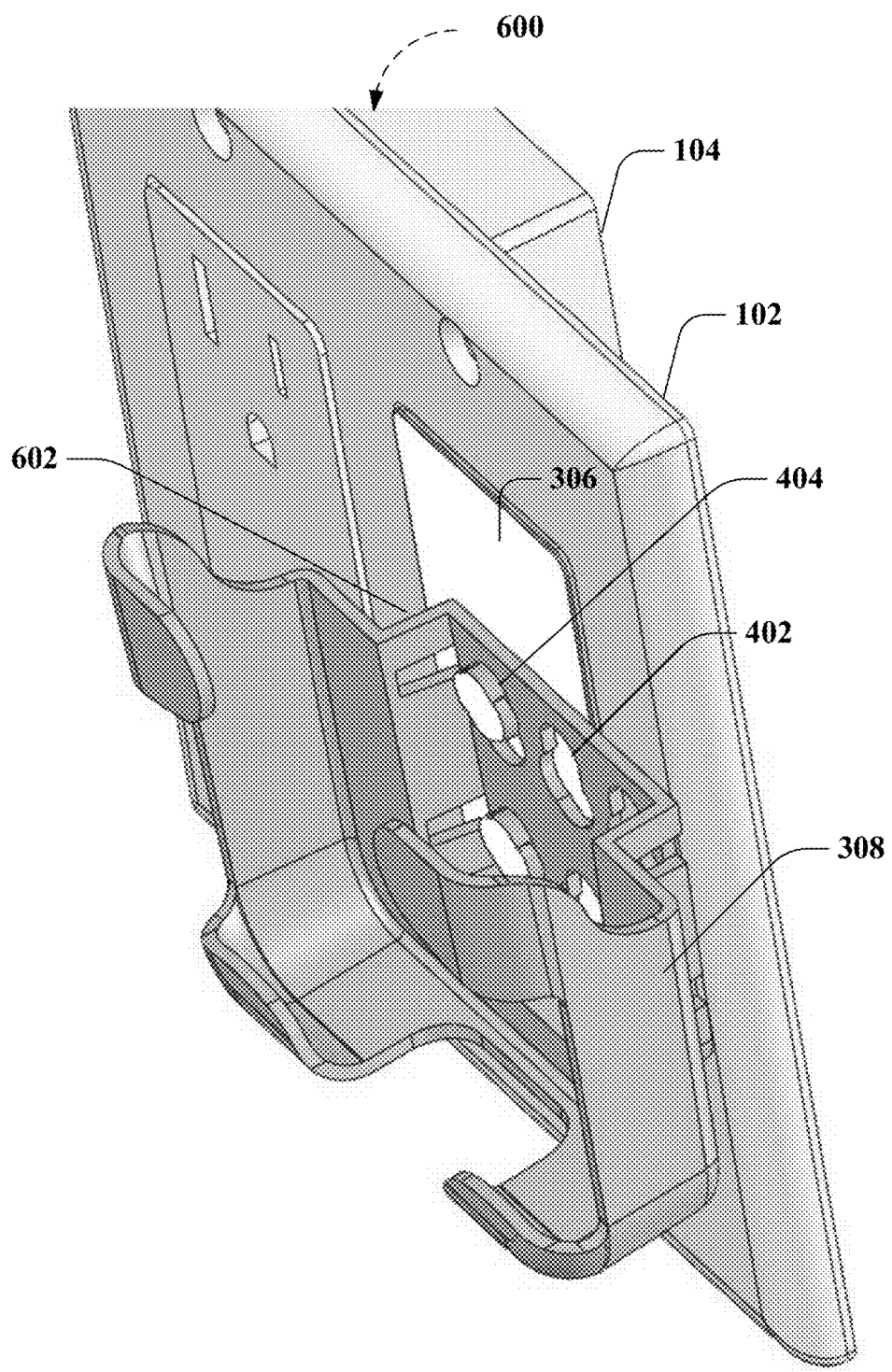
FIG. 6 depicts an exemplary dual gang wallplate and a single gang receptacle assembly demonstrating still other aspects of non-limiting implementations of the disclosed subject matter.
Figure 7:
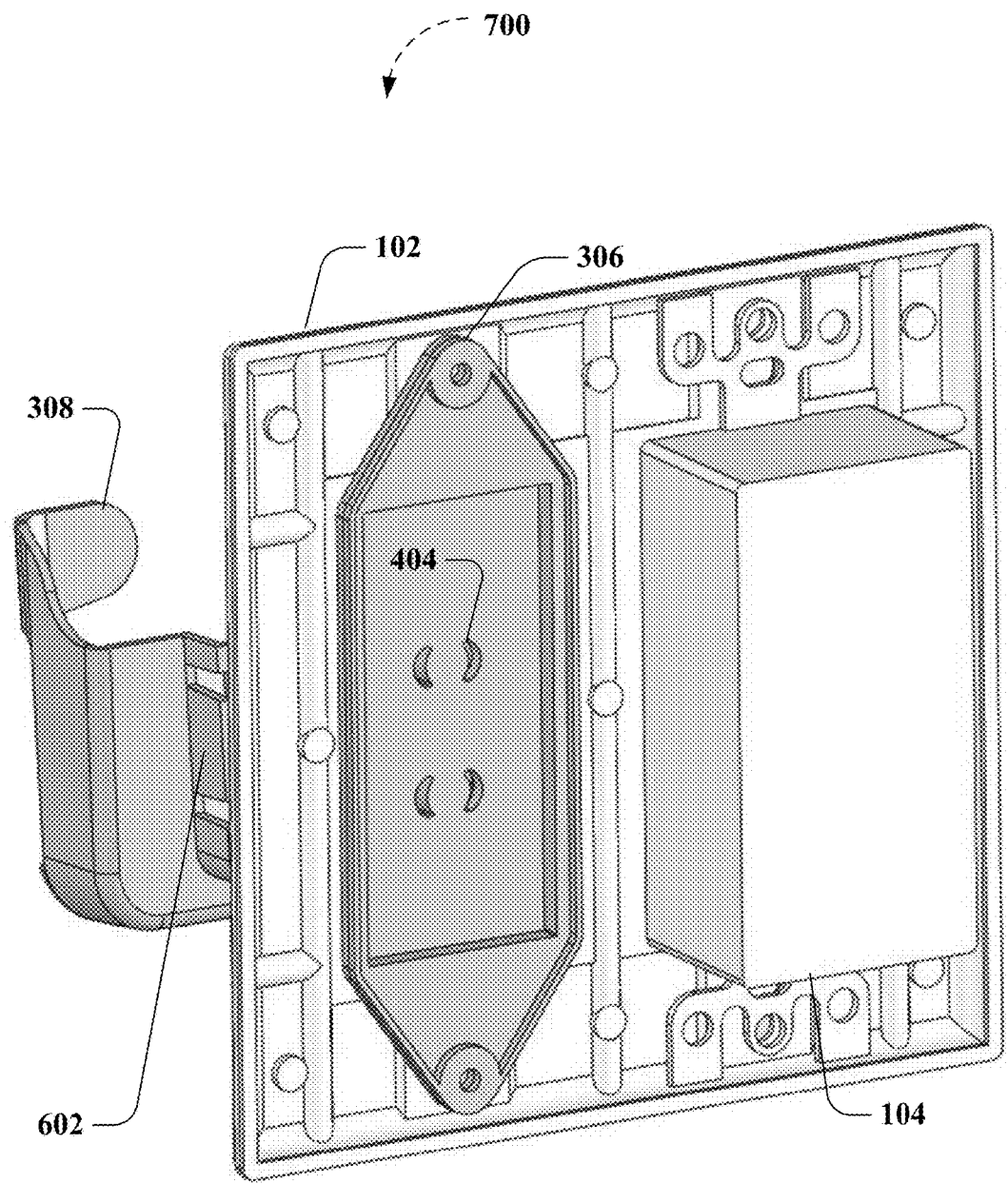
FIG. 7 depicts a backside perspective view of an exemplary dual gang wallplate and a single gang receptacle assembly demonstrating further aspects of non-limiting implementations of the disclosed subject matter.

FIG. 6 depicts an exemplary dual gang wallplate 102 and a single gang receptacle 104 assembly demonstrating still other aspects of non-limiting implementations of the disclosed subject matter. FIG. 7 depicts a backside perspective view of an exemplary dual gang wallplate 102 and a single gang receptacle 104 assembly demonstrating further aspects of non-limiting implementations of the disclosed subject matter. For instance, according to further non-limiting implementations of the disclosed subject matter, the device cradle (e.g., device cradle (304, 308), and so on, etc.) can be adapted to manage (e.g., such as by molding the device cradle (304, 308) which, when mounted to the strap or back plate (302, 306), protrudes out from wallplate 102, at 602, to facilitate cable management, and so on, etc.) one or more of a power cable, a data cable, or a signal carrying cable associated with the electronic device as depicted in FIGS. 3-5 and as further illustrated in FIGS. 6-7.

Figure 8:
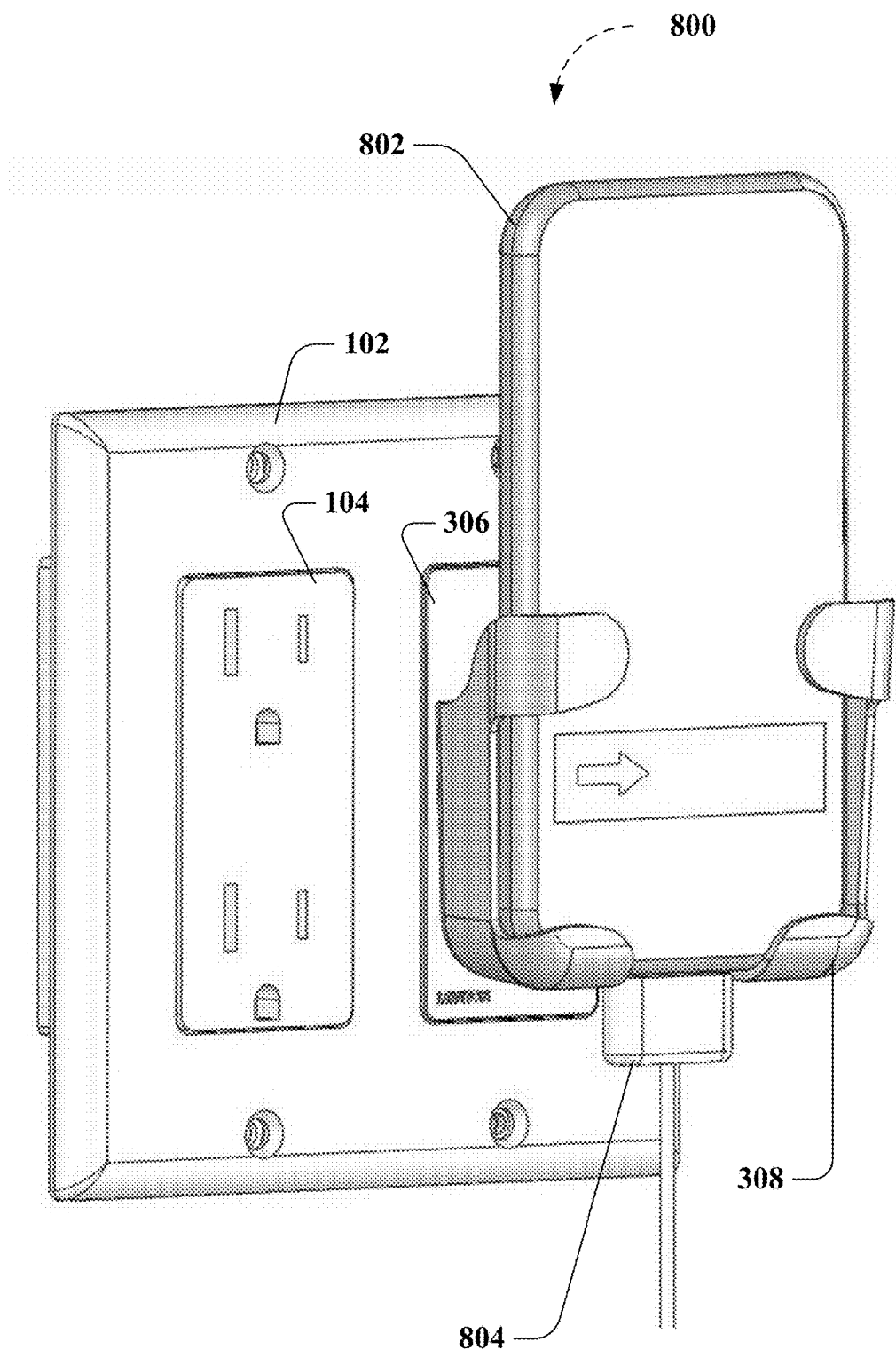
FIGS. 8-9 depict frontal perspective views of an exemplary dual gang wallplate and a single gang receptacle assembly demonstrating further aspects of non-limiting implementations of the disclosed subject matter.
Figure 9:
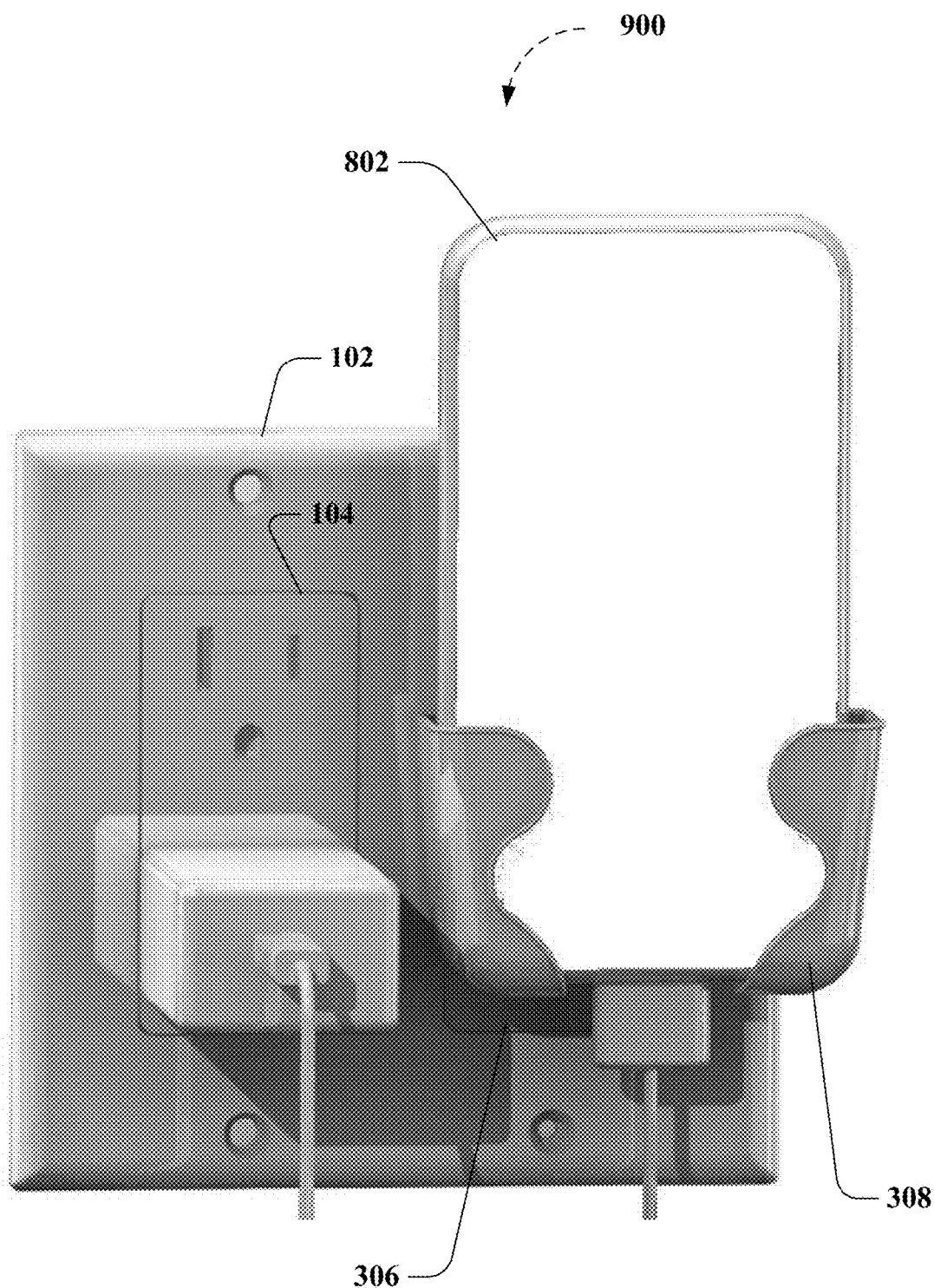

FIGS. 8-9 depict a frontal perspective view of an exemplary dual gang wallplate 102 and a single gang receptacle 104 assembly demonstrating further aspects of non-limiting implementations of the disclosed subject matter. For instance, FIGS. 8-9 depict a device being held in a device cradle (e.g., device cradle (304, 308), and so on, etc.) that is attached to a strap or back plate (302, 306), which strap or back plate (302, 306) is fastened to the wallplate 102. Thus, in various non-limiting implementations, the disclosed subject matter can include systems for holding an electronic device comprising a strap or back plate (302, 306) (e.g., a molded plastic back plate, etc.) that can be adapted to be fastened to a wallplate 102, and a device cradle (e.g., device cradle (304, 308), and so on, etc.) that can be further adapted to be attached to the molded plastic back plate (e.g., strap or back plate (302, 306), and so on, etc.). In addition, the device cradle (e.g., device cradle (304, 308), and so on, etc.) can also be configured to be removable (e.g., to be attached, removed, reattached, etc.) from the molded plastic back plate (e.g., strap or back plate (302, 306), and so on, etc.), such as by including removal and attachment mechanisms (e.g., screws, clips, latches, slots, pegs, pins, etc.). In other non-limiting implementations, the device cradle (e.g., strap or back plate (302, 306), and so on, etc.) can be further configured with a cable management portion as described herein adapted to manage or retain one or more of a power cable, a data cable, or a signal carrying cable associated with the electronic device, as further described herein.

In addition, as depicted in FIGS. 8-9 for example, exemplary systems including the device cradle (e.g., device cradle (304, 308), and so on, etc.) can be further configured to allow passage of one or more of a power cable, a data cable, or a signal carrying cable (e.g., audio, video, analog signal, digital signal, etc.) 804 associated with the electronic device 802 when attached to the electronic device 802 and when the electronic device 802 is inserted into the device cradle (e.g., device cradle (304, 308), and so on, etc.). In further non-limiting implementations, the molded plastic back plate (e.g., strap or back plate (302, 306), and so on, etc.) can be further configured to mount flush to a mounting surface (e.g., a wall, a surface of an enclosure such as a cabinet, etc.) for the wallplate 102 absent an available station in a junction box located or installed in the wall or mounting surface (e.g., dual gang junction box with a triple gang wallplate 102, single gang junction box with a dual gang wallplate 102, and so on, etc.) or absent a junction box altogether (e.g., for direct mounting to a wall, mounting surface, etc.).

Moreover, as described herein, various exemplary implementations can further comprise electronics and connectors, such as converters, for example, adapted to convert a line voltage to a USB standard voltage, or other peripheral connection standard voltage, to facilitate one or more of connecting or charging an electronic device. In addition, FIG. 9 further depicts a device cradle (e.g., device cradle (304, 308), and so on, etc.) that can be adapted to hold an electronic device 802 proximate to one or more of an electrical outlet (e.g., comprising receptacle 104, etc.), a switch, or a control device and that can be adapted to manage or organize one or more of a power cable, a data cable, or a signal carrying cable associated with the electronic device 802. Note that in FIG. 9, the power cable associated with the electronic device 802 passes through a portion of the device cradle (e.g., device cradle (304, 308), and so on, etc.), and the associated charger or transformer (e.g., wall-wart, etc.) is plugged into an outlet proximate the electronic device 802.

Figure 10:
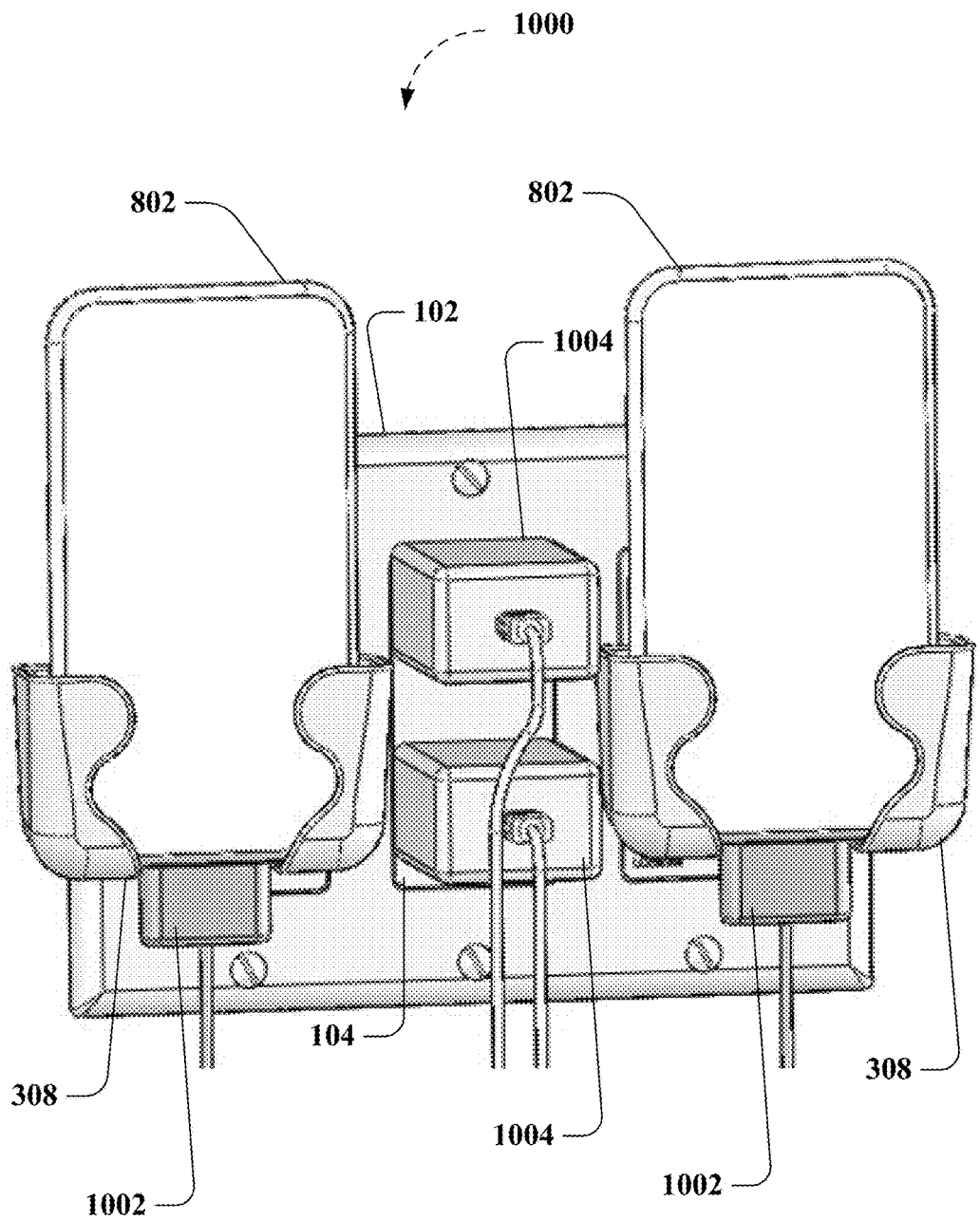
FIG. 10 depicts a frontal perspective view of an exemplary triple gang wallplate and a single gang receptacle assembly demonstrating still further aspects of non-limiting implementations of the disclosed subject matter.

FIG. 10 depicts a frontal perspective view of an exemplary triple gang wallplate 102 and a single gang receptacle 104 assembly demonstrating still further aspects of non-limiting implementations of the disclosed subject matter. For instance, FIG. 10 depicts a triple gang wallplate 102 attached to a single gang junction box (not shown) comprising a single gang receptacle 104 (or a dual or triple gang junction box without other devices at the stations of the junction box other than that of the single gang receptacle). Note that in FIG. 10, the power cables 1002 associated with the respective electronic devices 802 can pass through portions of the respective device cradles, and the associated chargers 1004 or transformers (e.g., wall-warts, etc.) are plugged into an outlet proximate the electronic devices 802.

Figure 11:
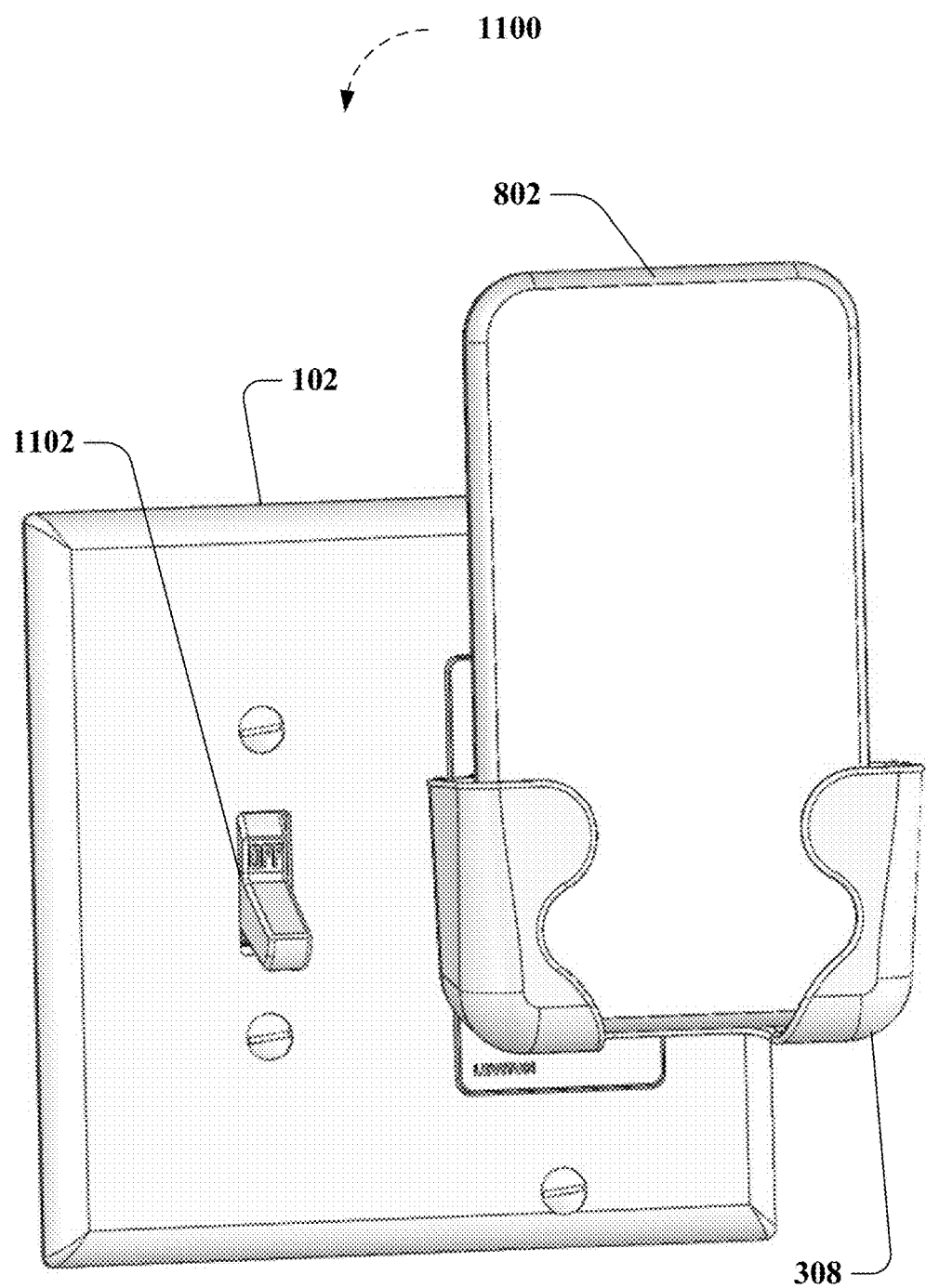
FIGS. 11-13 depict frontal perspective views of exemplary dual gang wallplates and single gang switch or control assemblies demonstrating yet other aspects of non-limiting implementations of the disclosed subject matter.
Figure 12:
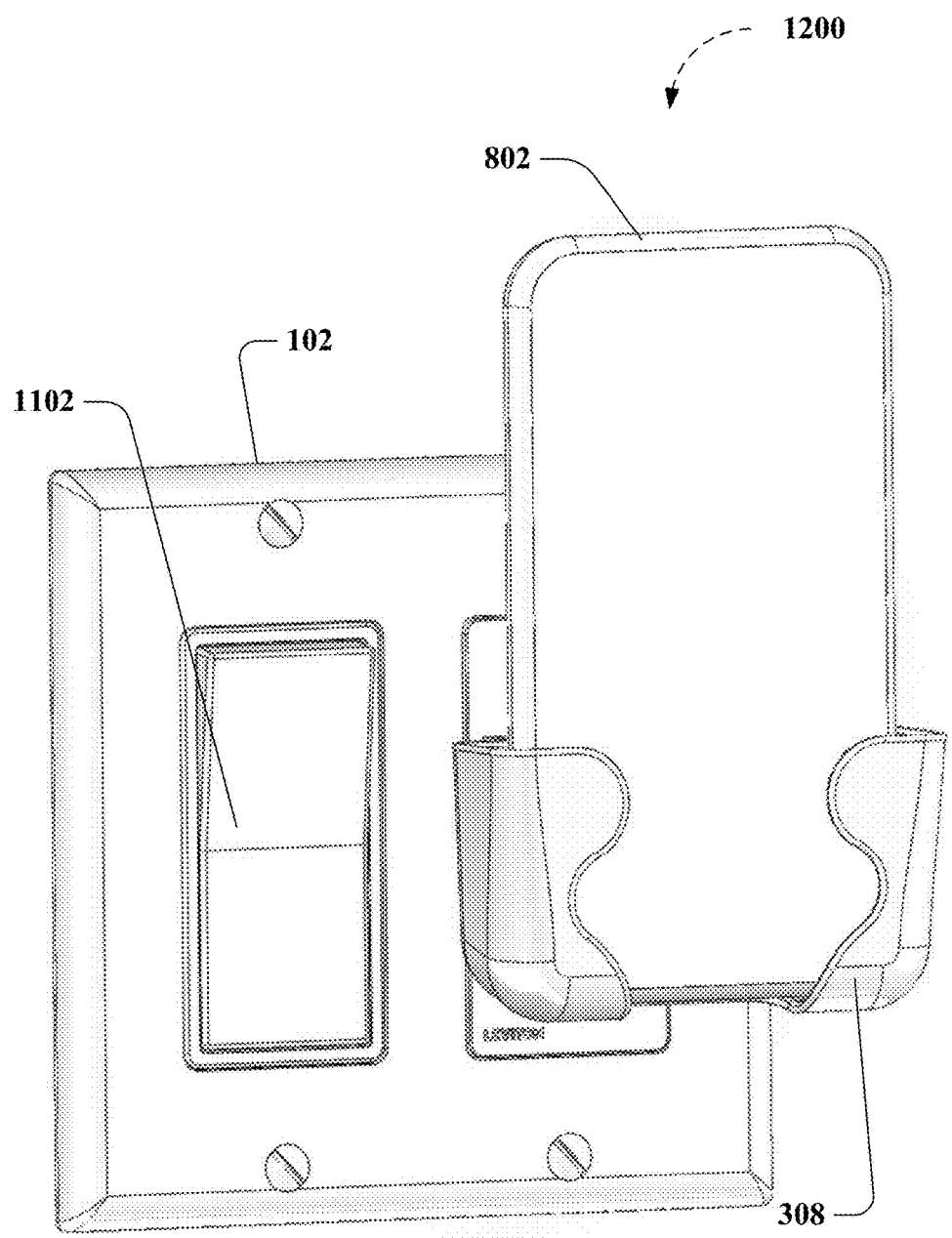
Figure 13:
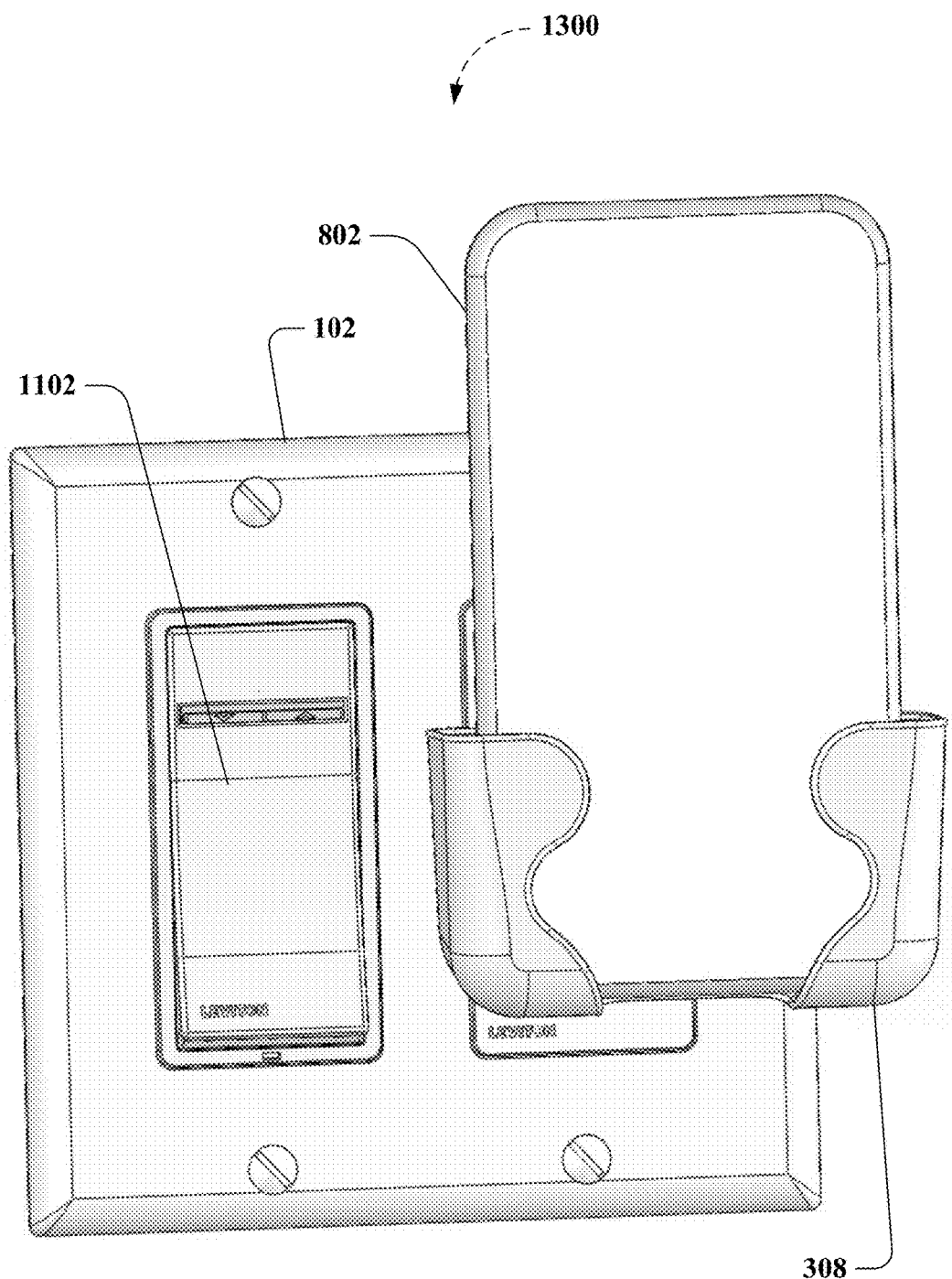

FIGS. 11-13 depict frontal perspective views of exemplary dual gang wallplate 102*s* and single gang switch or control assemblies demonstrating yet other aspects of non-limiting implementations of the disclosed subject matter. For example, FIGS. 11-13 depict dual gang wallplate 102*s* attached to single gang junction boxes (not shown) and attached to different types of single gang devices 1102 (e.g., switch, dimmer switch, control, etc.) (or a double gang junction box without another device at the station of the junction box other than that of the single gang device). For instance, FIG. 13 depicts a dual gang wallplate 102 attached to single gang junction box (not shown) and attached to a Leviton® Vizia RF+® Home Controls single gang device 1102 (e.g., a dimmer control, etc.) (or a double gang junction box without another device at the station of the junction box other than that of the single gang device).

Figure 14:
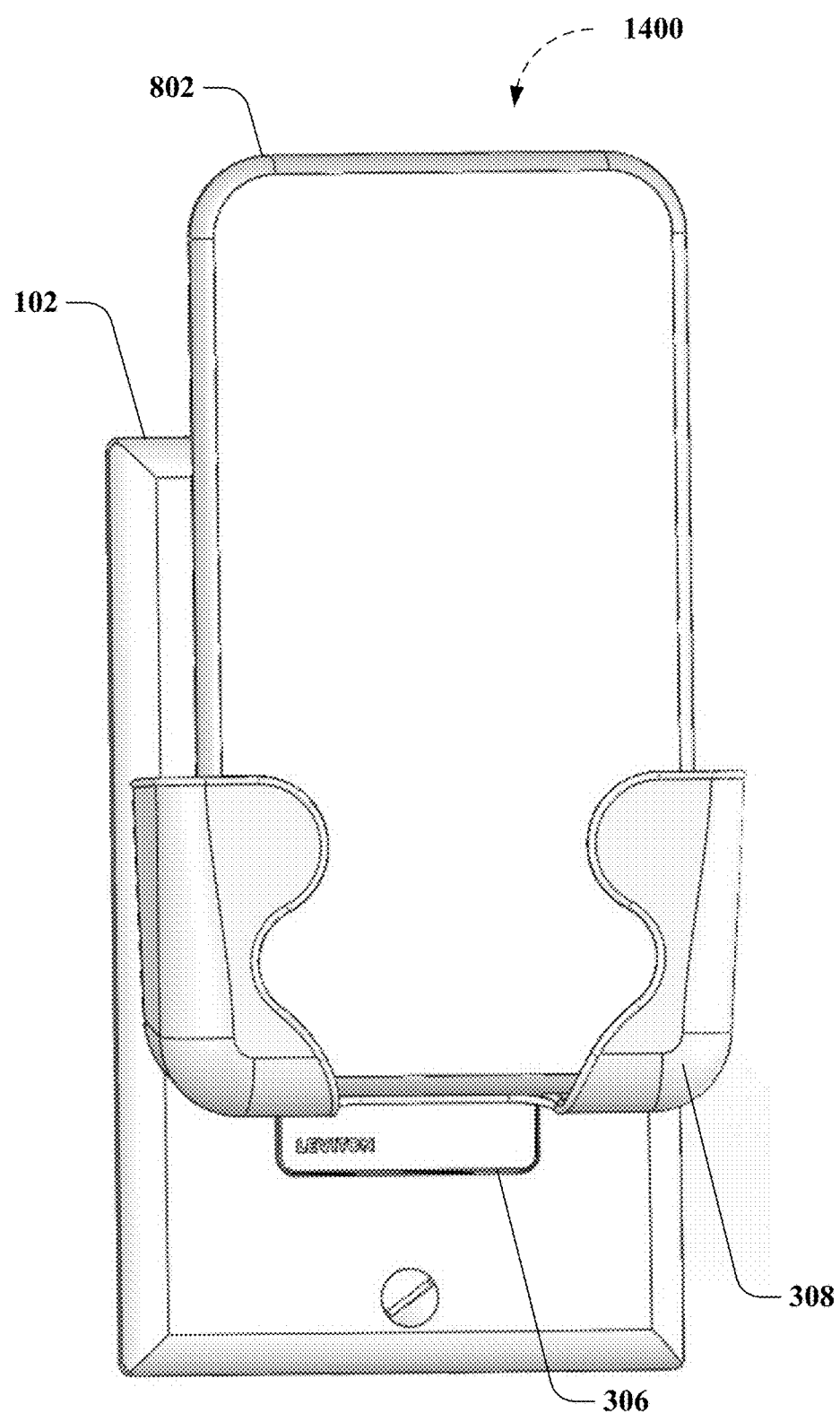
FIG. 14 depicts a frontal perspective view of an exemplary single gang wallplate with non-limiting implementations that demonstrate yet other aspects of the disclosed subject matter.

FIG. 14 depicts a frontal perspective view of an exemplary single gang wallplate 102 with non-limiting implementations that demonstrate yet other aspects of the disclosed subject matter. For example, FIG. 14 depicts a single gang wallplate 102 attached directly to a wall or mounting surface absent a junction box or to a single gang junction box (not shown) without a device at the station of the junction box (e.g., an empty junction box). Thus, as further described herein, various embodiments of the disclosed subject matter can be employed with or without installed junction boxes in a retrofit or standalone manner and proximate to or separate from other devices such as switches, receptacles, dimmer switches, controls, etc.

Figure 15:
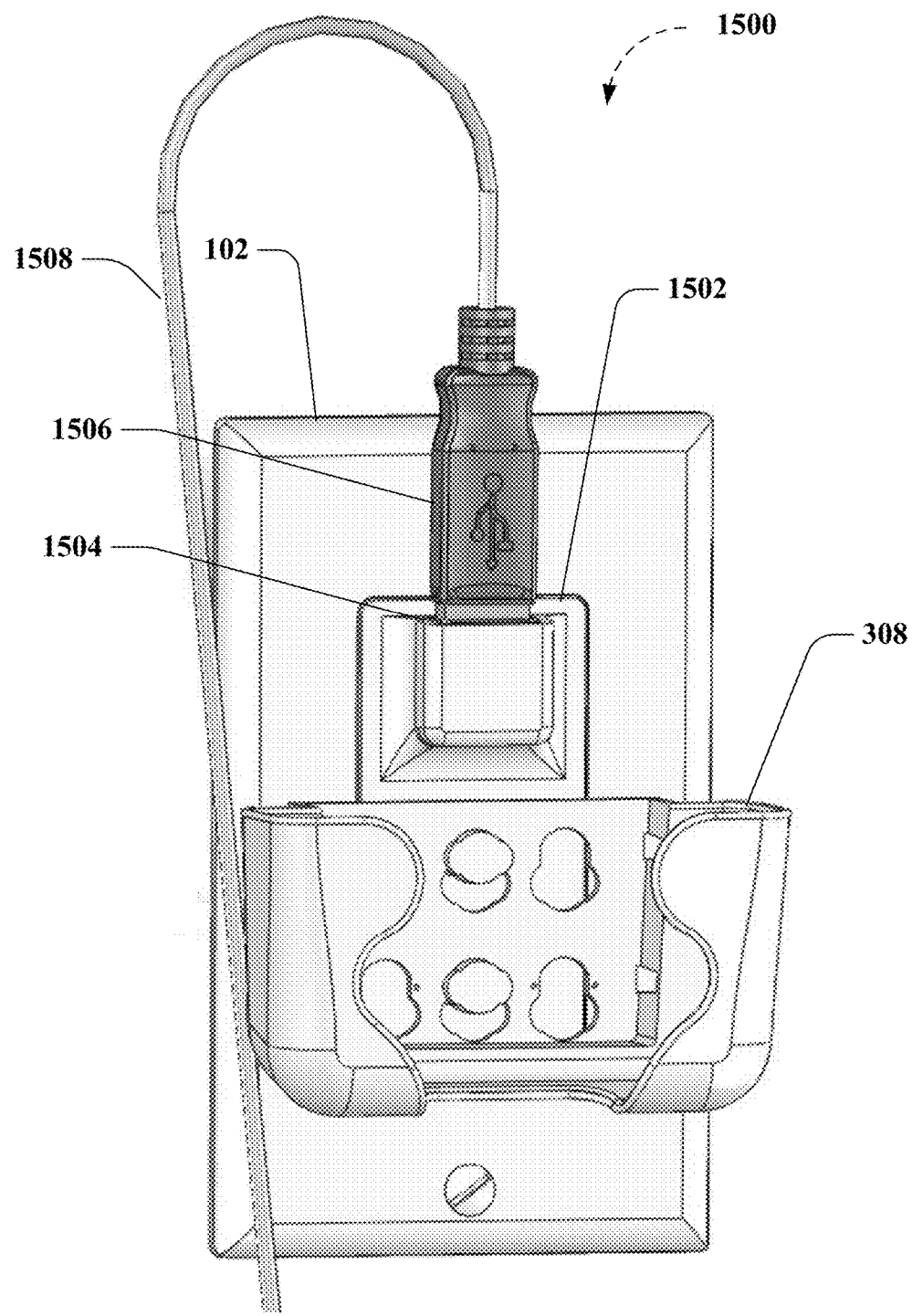
FIG. 15 depicts a frontal perspective view of an exemplary single gang wallplate with further non-limiting implementations that demonstrate yet other aspects of the disclosed subject matter.
Figure 16:
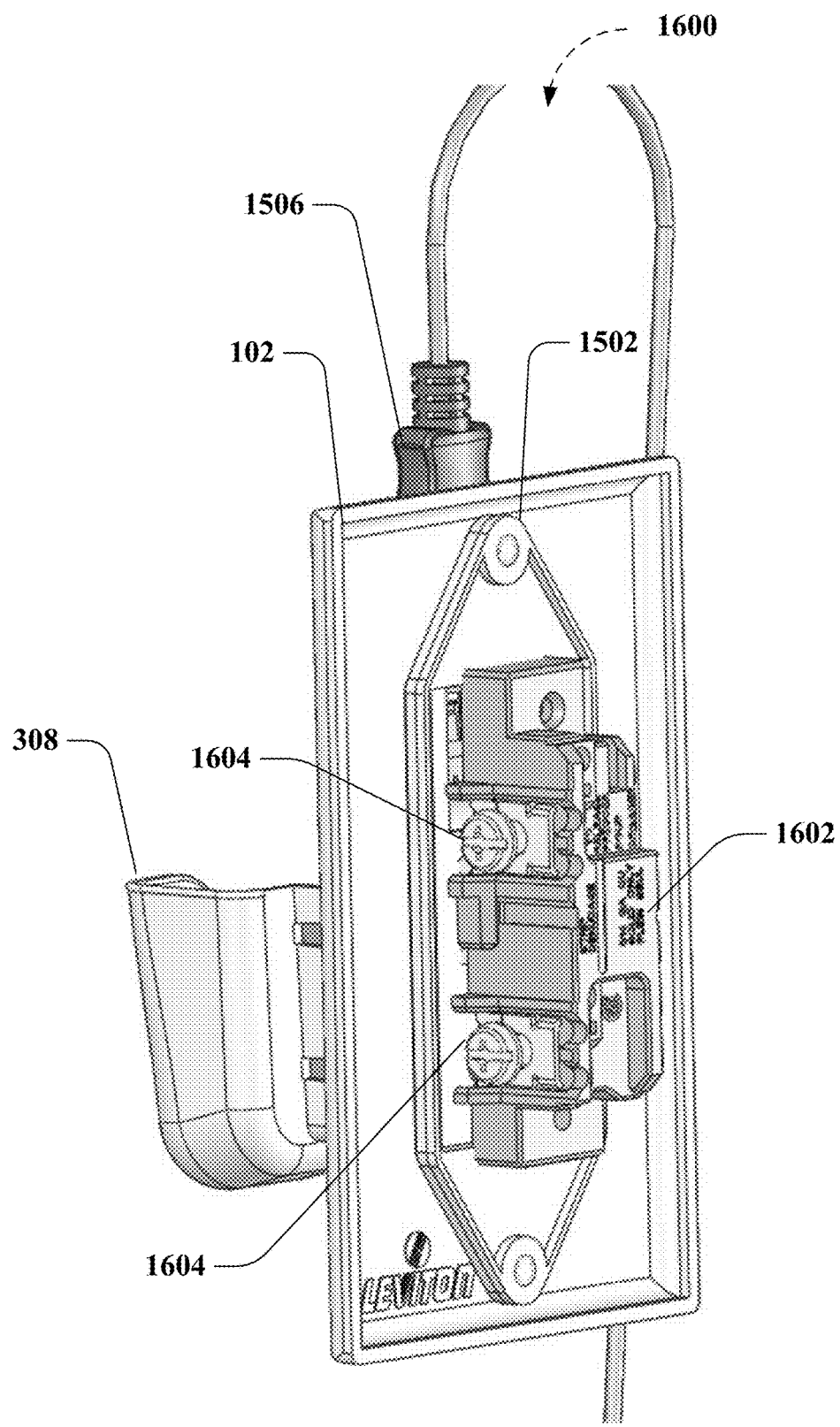
FIG. 16 depicts a backside perspective view of an exemplary single gang wallplate and non-limiting implementations of the disclosed subject matter that demonstrate further aspects of the disclosed subject matter.
Figure 17:
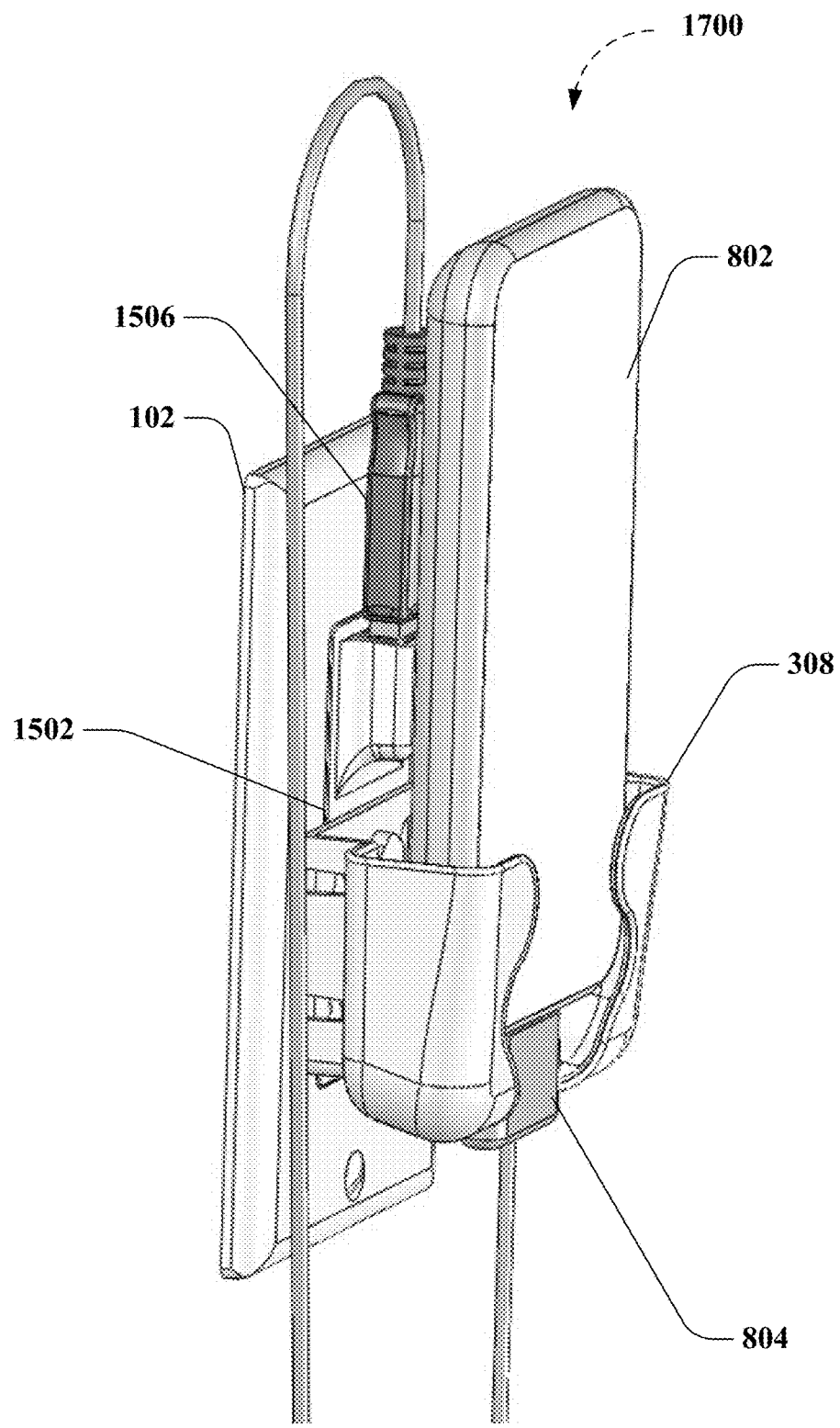
FIGS. 17-18 depict further perspective views of an exemplary single gang wallplate and non-limiting implementations that demonstrate still further aspects of the disclosed subject matter.
Figure 18:
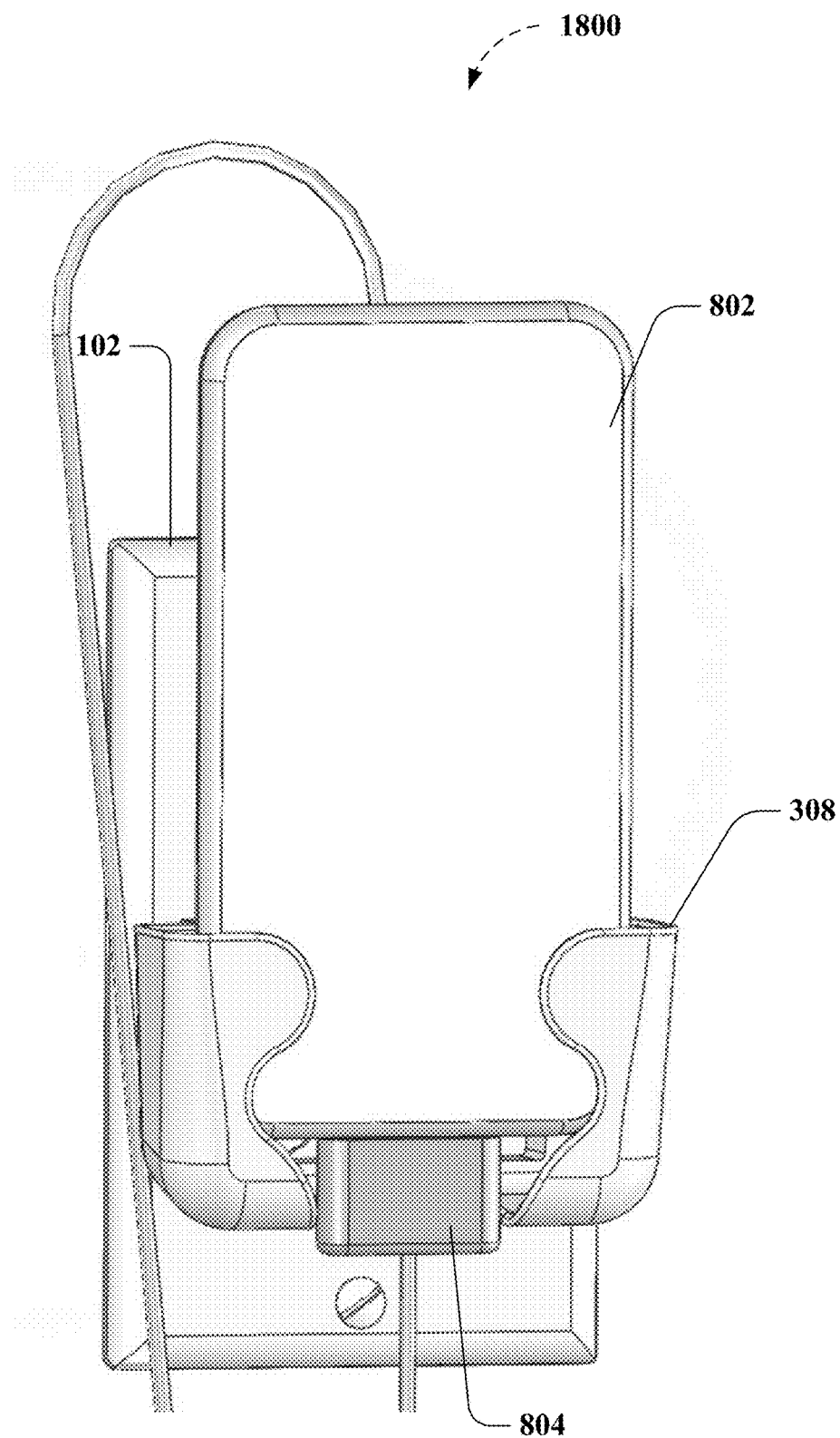

FIG. 15 depicts a frontal perspective view of an exemplary single gang wallplate 102 with further non-limiting implementations that demonstrate yet other aspects of the disclosed subject matter. As described herein, various embodiments of the disclosed subject matter can comprise back plate or strap 1502 associated with electronics and/or connectors 1504, such as converters, for example, adapted to convert line voltage (e.g., United States standard 60 Hertz 120 Volts Alternating Current line voltage, other standard line voltage, etc.) to a USB standard voltage (e.g., +5 Volts Direct Current (DC), or other standard peripheral connection standard voltage, etc.) to facilitate one or more of connecting or charging an electronic device. Thus, FIG. 15 depicts a back plate or strap 1502 comprising a connector 1504 that facilitates connecting a USB plug 1506 and cable 1508 of an associated electronic device as shown in FIGS. 17-18, for example. FIG. 16 depicts a backside perspective view of an exemplary single gang wallplate 102 and non-limiting implementations that demonstrate further aspects of the disclosed subject matter. Thus, FIG. 16 further depicts electronics 1602 such as one or more of a transformer, rectifier, converter, etc. and connectors 1604 that facilitate connecting alternating current line voltage to the electronics. FIGS. 17-18 depict further perspective views of an exemplary single gang wallplate 102 and non-limiting implementations holding an electronic device 802 that demonstrate still further aspects of the disclosed subject matter.

Figure 19:
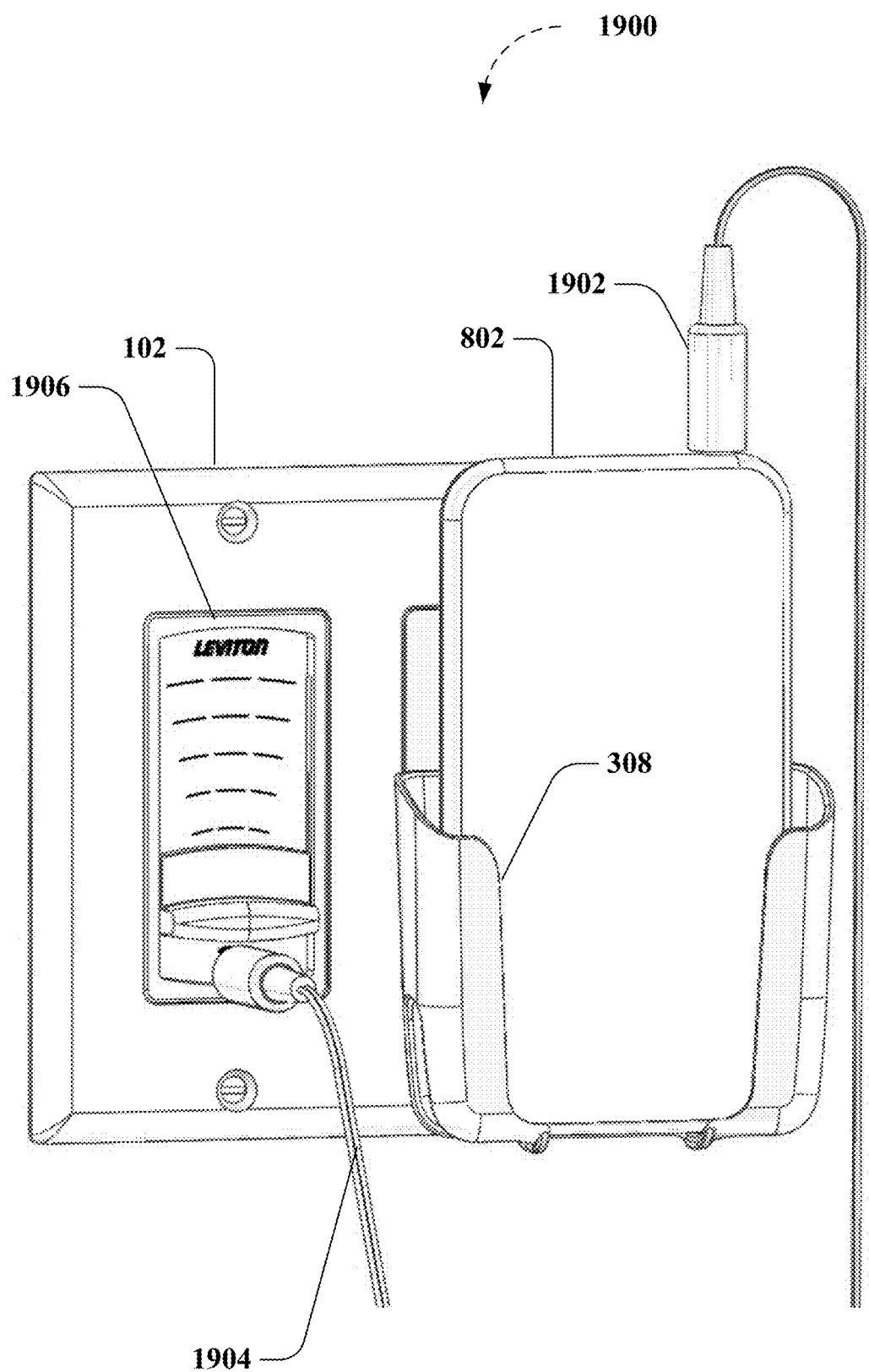
FIGS. 19-22 demonstrate further aspects of various non-limiting implementations of the disclosed subject matter.
Figure 20:
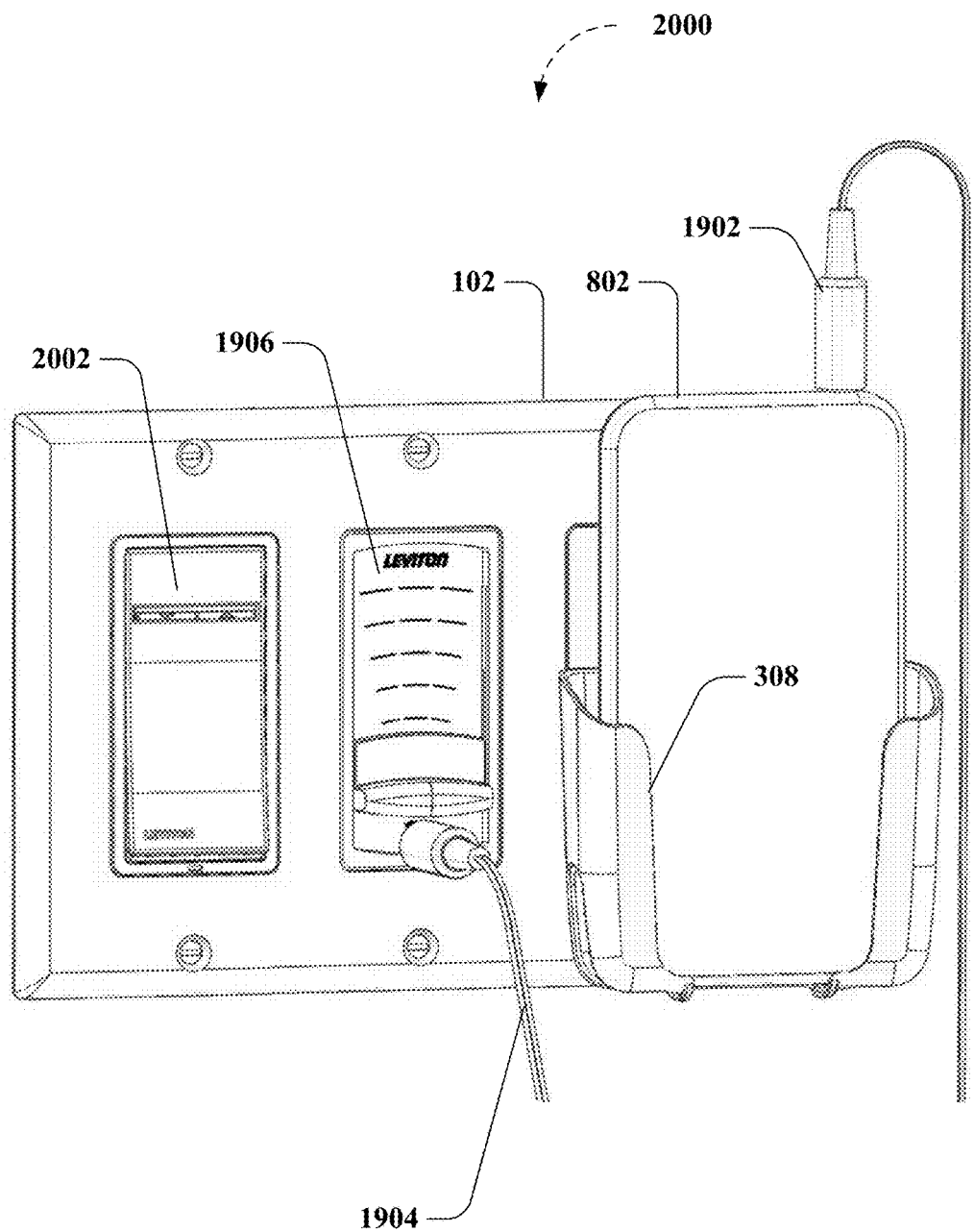
Figure 21:
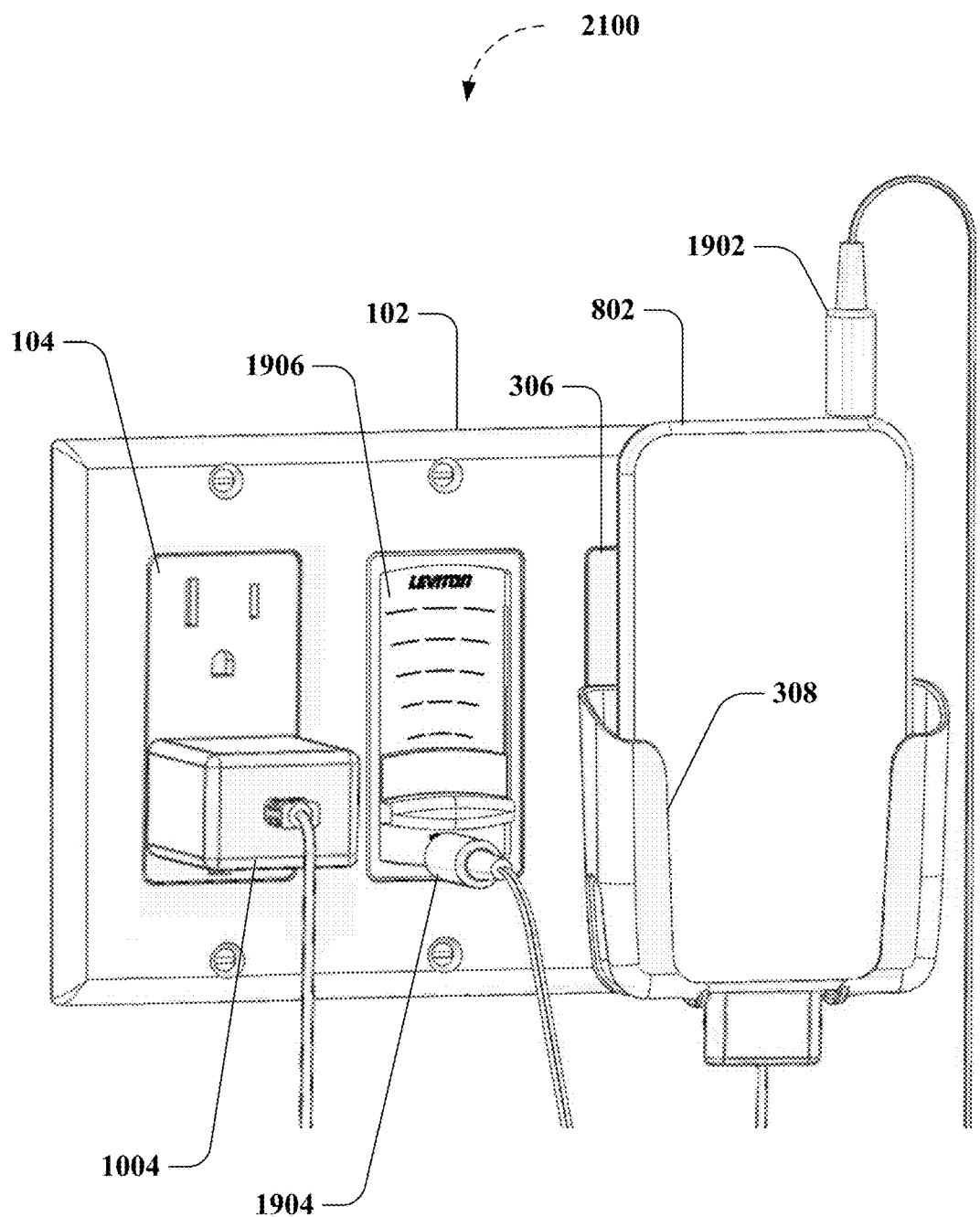
Figure 22:
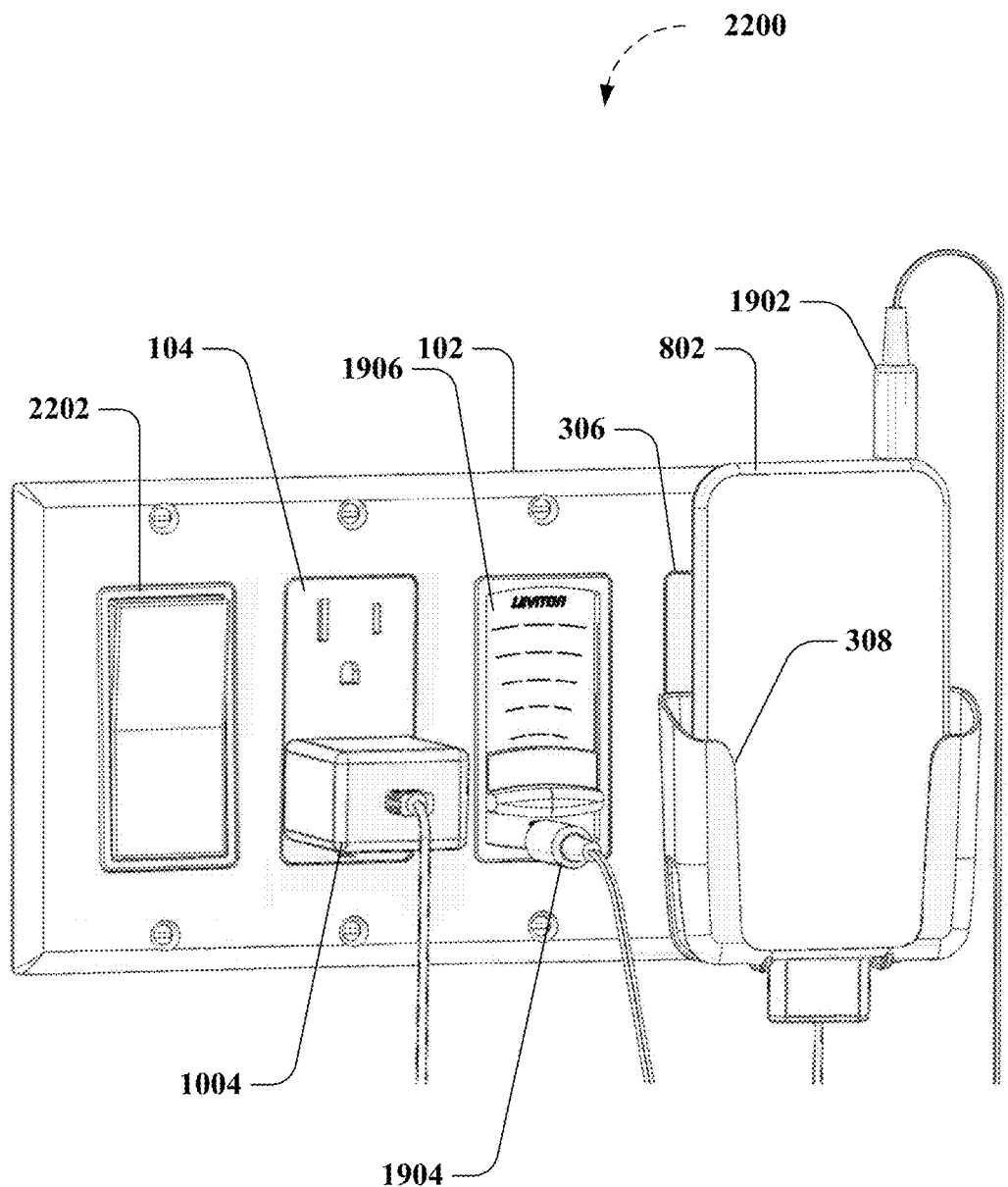

FIGS. 19-22 depict further aspects of various non-limiting implementations of the disclosed subject matter. For instance, FIG. 19 depicts a dual gang wallplate 102 attached to a single gang junction box (not shown) comprising a single gang volume control (or a dual gang junction box without another device at a station of the junction box other than that of the single gang volume control). Thus, FIG. 19 depicts an electronic device 802 in a device cradle (e.g., device cradle (304, 308), and so on, etc.) as previously described. In addition, FIG. 19 depicts a 3.5 millimeter (mm) audio jack 1902 and cable 1904 connected to the electronic device 802 and also connected to a volume control device 1906. FIGS. 20-21 further depict triple gang wallplates 102 attached to dual gang junction boxes (not shown) comprising two single gang devices (e.g., volume control device 1906 and device 2002, etc.) (or a triple gang junction box without other devices at the station of the junction box other than that of the two single gang devices). Accordingly, FIGS. 20-21 depict a device 802 in a device cradle (e.g., device cradle (304, 308), and so on, etc.) as previously described, in addition to depicting a 3.5 mm audio jack 1902 and cable 1904 connected to the electronic device 802 and also connected to a volume control device 1906, and a transformer 1004 (e.g., wall-wart) attached to a receptacle 104, or another single gang control, such as described above regarding FIG. 13. FIG. 22 depicts a quad wallplate 102 attached to a triple gang junction box (not shown) comprising a single gang volume control 1906, a single gang receptacle 104, and a single gang switch 2202 (or a quad junction box without another device at the station of the junction box other than that of the three single gang devices). Thus, FIG. 22 depicts a device 802 in a device cradle (e.g., device cradle (304, 308), and so on, etc.) as previously described, in addition to depicting a 3.5 mm audio jack 1902 and cable 1904 connected to the electronic device 802 and also connected to a volume control device 1906, a transformer 1004 (e.g., wall-wart) attached to a receptacle 104, and a single gang switch 2202.

Figure 23:
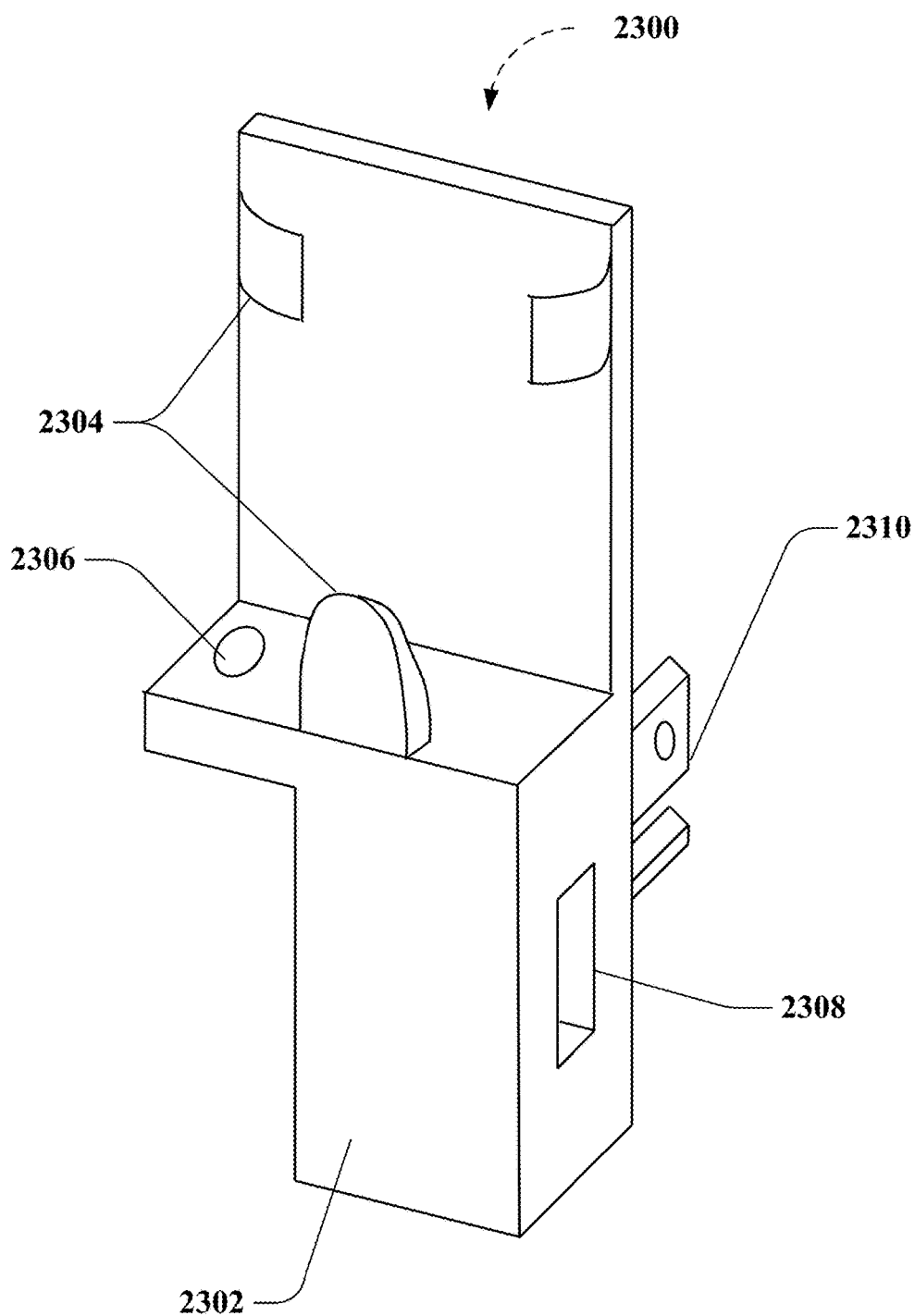
FIG. 23 depicts a frontal perspective view of an exemplary device cradle demonstrating still further aspects of non-limiting implementations of the disclosed subject matter.

FIG. 23 depicts a frontal perspective view of an exemplary device cradle 2300 demonstrating still further non-limiting implementations of an article of manufacture according to various aspects of the disclosed subject matter. For instance, in further non-limiting implementations, an article of manufacture 2300 can comprise a device cradle 2302 adapted to hold an electronic device (e.g., via one or more of tabs 2304) proximate to one or more of an electrical outlet, a switch, or a control device, and so on, etc. In an aspect, the article of manufacture 2300 can be adapted to manage (e.g., via an accommodation for a cable at 2306, etc.) at least one of a power cable, a data cable, or a signal carrying cable associated with the electronic device, for instance, as further described herein. In addition, the article of manufacture can further comprise one or more attachment mechanism(s) on the device cradle adapted to allow attachment and removal of the device cradle to the wallplate 102. As a further example, in a non-limiting aspect as further described herein, articles of manufacture according to the disclosed subject matter can further comprise electronics (e.g., transformers, rectifiers, etc.) and connectors (receptacle 104 plug, USB connector, etc.) 2308, 2310, such as converters, for example, adapted to convert line voltage to a USB standard voltage or other peripheral connection standard voltage to facilitate one or more of connecting or charging an electronic device. Moreover, the one or more attachment mechanism(s) of the various embodiments can comprise conducting prongs 2310 adapted to conduct a voltage to the electronics and to hold the electronic device proximate the wallplate 102 by mechanical tension exerted by an electrical outlet (e.g., receptacle 104, etc.). In yet another non-limiting aspect, the device cradle can be further configured to allow passage (e.g., via an accommodation for a cable at 2310, etc.) of one or more of a power cable, a data cable, or a signal carrying cable associated with the electronic device when attached to the electronic device and when the electronic device is inserted into the device cradle 2302.

Figure 24:
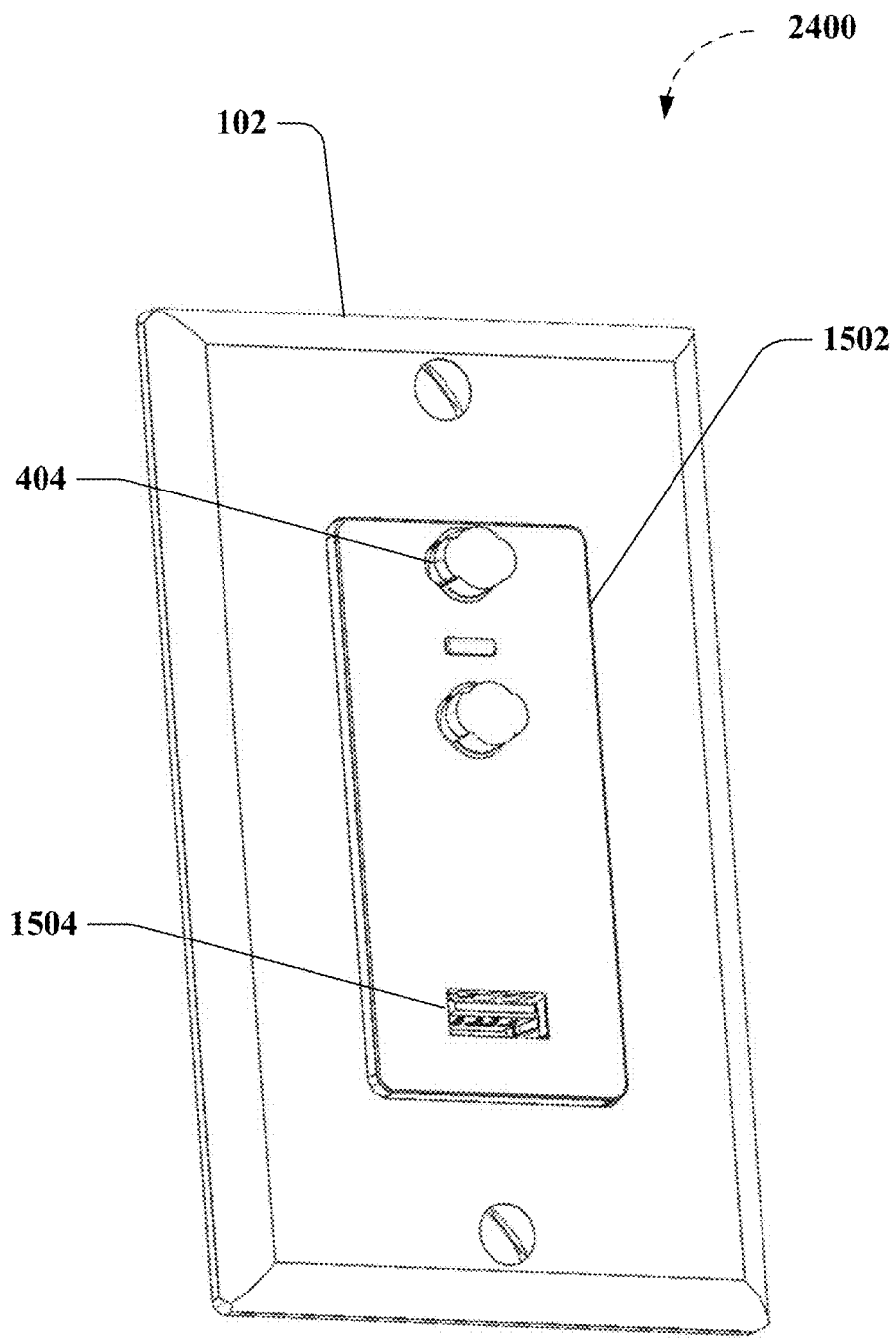
FIGS. 24-36 demonstrate additional aspects of further non-limiting implementations of the disclosed subject matter.
Figure 25:
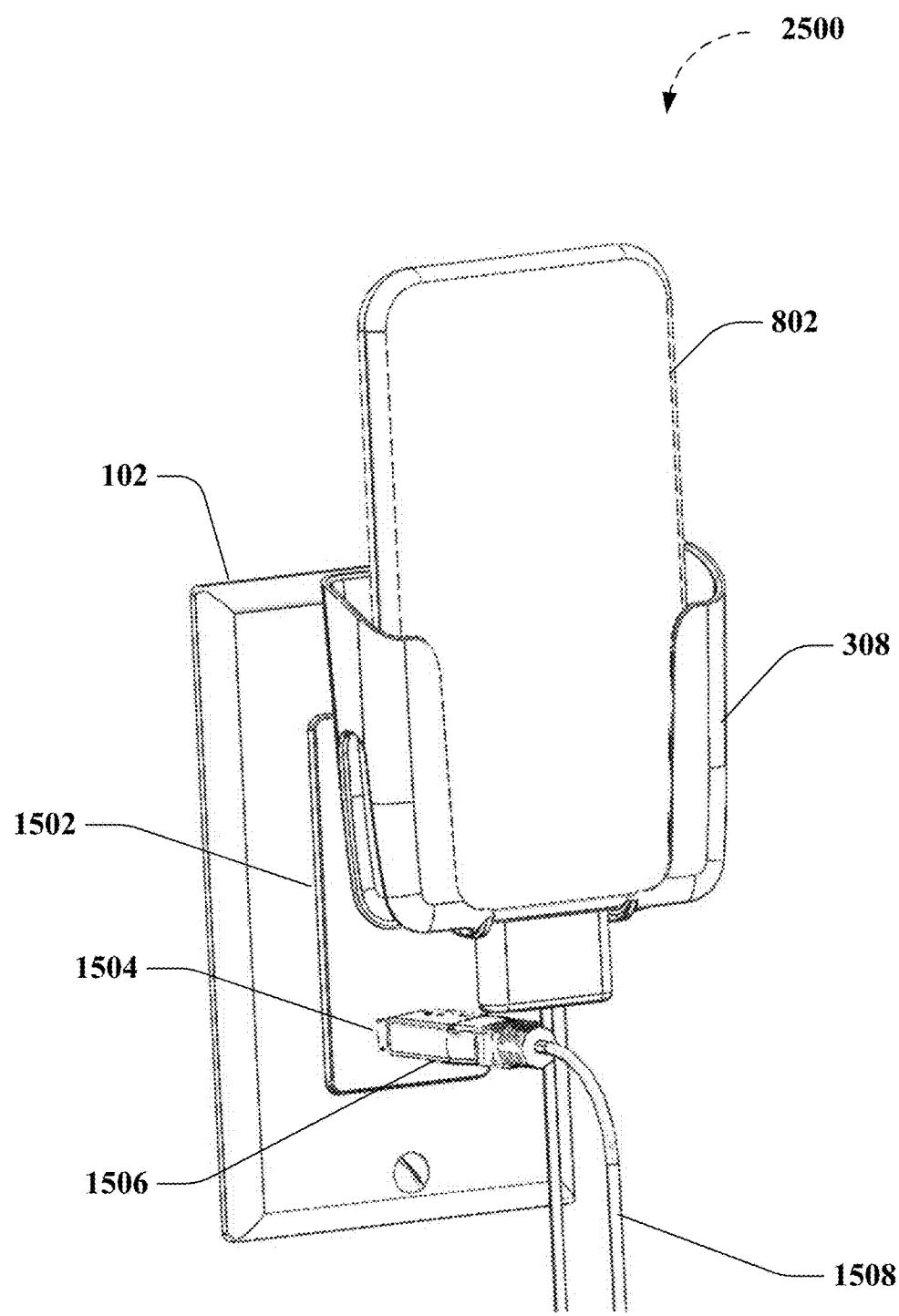

FIGS. 24-31 demonstrate additional aspects of further non-limiting implementations of the disclosed subject matter. For instance, FIGS. 24-25 depict frontal perspective views of an exemplary single gang wallplate 102 with further non-limiting implementations that demonstrate aspects of the disclosed subject matter.

For example, by comparison to the various embodiments of FIGS. 15-16, it can be seen that numerous variations of the disclosed embodiments can be designed and employed without departing from the scope of the disclosed subject matter. As an example, note the placement of the one or more second attachment mechanism(s) 404, which can be adapted to facilitate attachment and removal of a device cradle as described herein. As an illustrative example, FIGS. 24-25 depict the one or more second attachment mechanism(s) 404, or portions thereof, located proximate to a first edge (e.g., a top edge) of the back plate or strap 1502 that facilitates attachment and removal of a device cradle (e.g., device cradle (304, 308), and so on, etc.), while a USB connector 1504 of the back plate or strap 1502 that facilitates connecting a USB plug 1506, and cable 1508 of an associated electronic device 802 is located proximate a second edge (e.g., a bottom edge) of the back plate or strap 1502, where the second edge is approximately opposite the first edge.

Note further that the device cradle (e.g., device cradle (304, 308), and so on, etc.) can be installed on the back plate or strap 1502 in an orientation that is rotated (e.g., 180 degrees from that depicted in FIGS. 24-25) allowing the device cradle (e.g., device cradle (304, 308), and so on, etc.) to attach to the back plate or strap 1502 near the bottom edge of the back plate or strap 1502. It can be further understood that additional variations of the disclosed embodiments can be fabricated that allow the disclosed embodiments to be oriented horizontally, such as by variations in the one or more second attachment mechanism(s), or by use of one or more omni-directional, flexible, rotating, or other suitable variants of the second attachment mechanism(s). That is, variations of the one or more second attachment mechanism(s) can enable the device cradle (e.g., device cradle (304, 308), and so on, etc.) to be installed on the back plate or strap 1502 in an orientation that is rotated 90 degrees (clockwise or counterclockwise), or other acceptable angle or orientation, from that depicted in FIGS. 24-25, thereby allowing the device cradle (e.g., device cradle (304, 308), and so on, etc.) to attach to the back plate or strap 1502 near a left or right edge of the back plate or strap 1502, for example.

Figure 26:
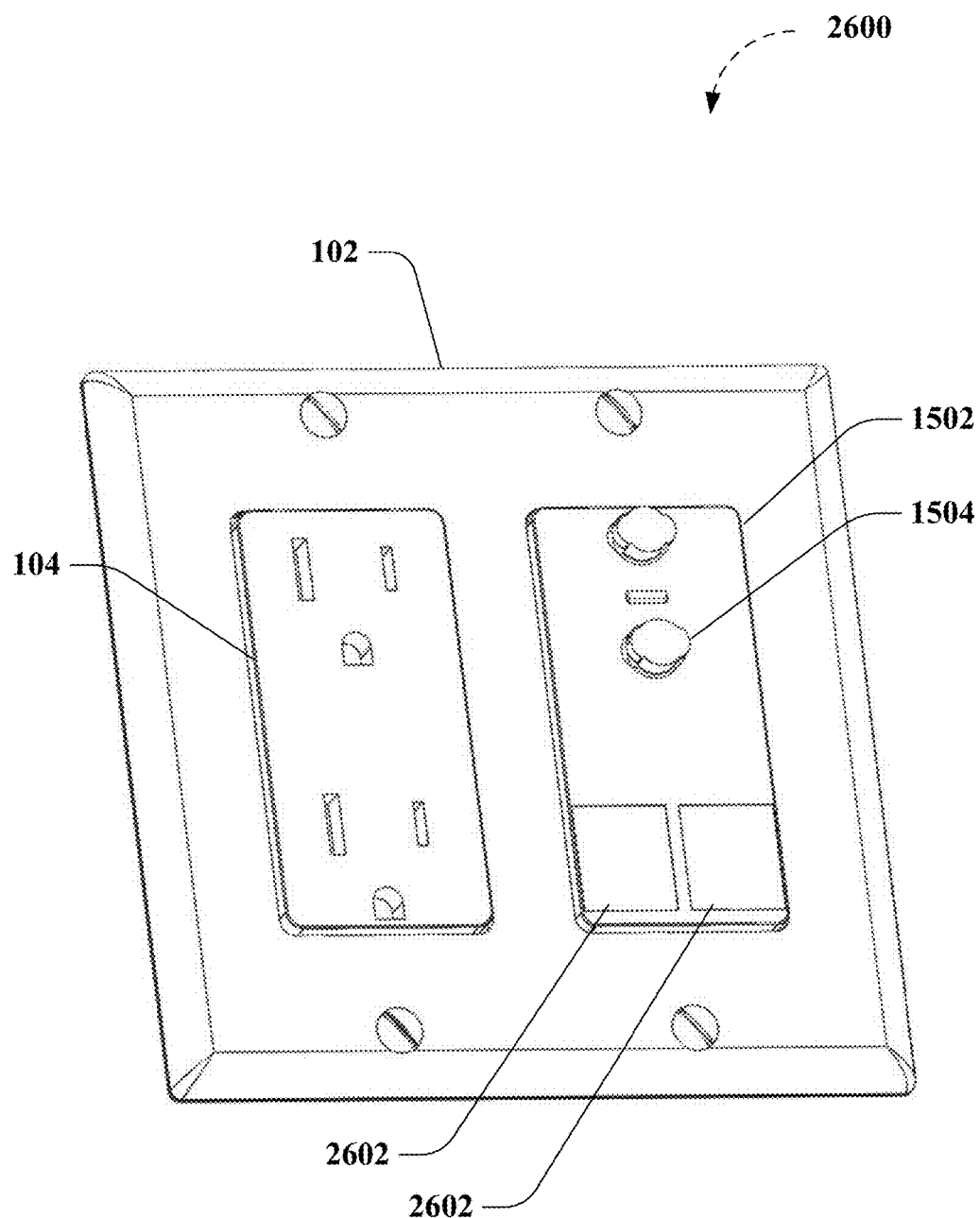

FIGS. 26-31 depict still further non-limiting implementations that demonstrate additional aspects of the disclosed subject matter. For example, further embodiments of the disclosed subject matter can provide additional flexibility by employing a set of connector stations 2604 (e.g., one or more connector stations) that can conform to a standardized form-factor, or otherwise, formed in the strap or back plate (302, 306), which connector stations 2604 can be adapted to accept one of a multitude of variations of connector(s) types 2700 and/or configuration(s) (e.g., standardized inserts). For instance, FIG. 26 depicts an exemplary embodiment of a back plate or strap 2602 comprising a 1×2 set of connector stations 2604 that conform to the Leviton® QuickPort® standardized form-factor and that are adapted to accept one of a multitude of variations of connector(s) types and/or configuration(s) (e.g., QuickPort® standardized inserts).

Figure 27:
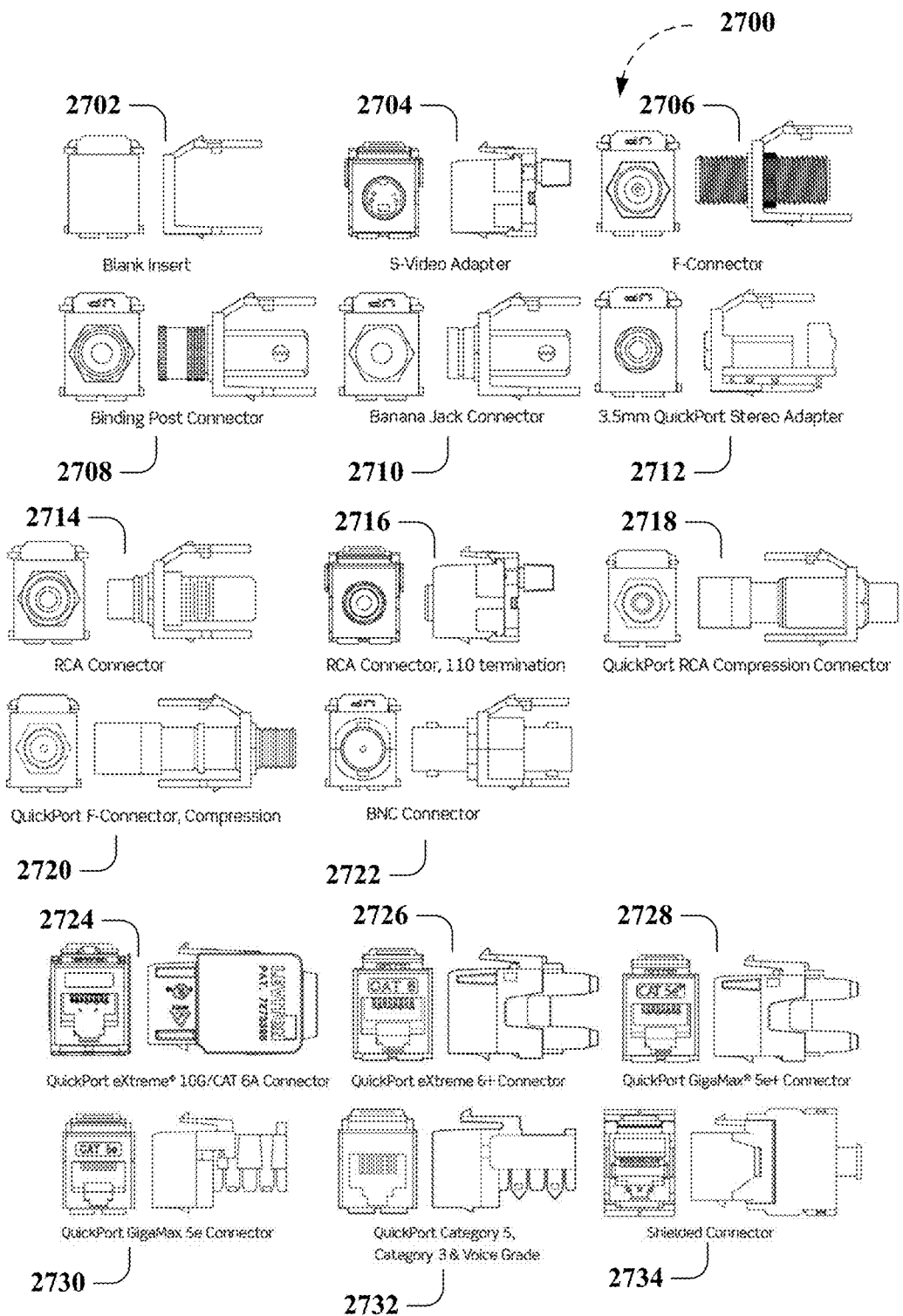
Figure 28:
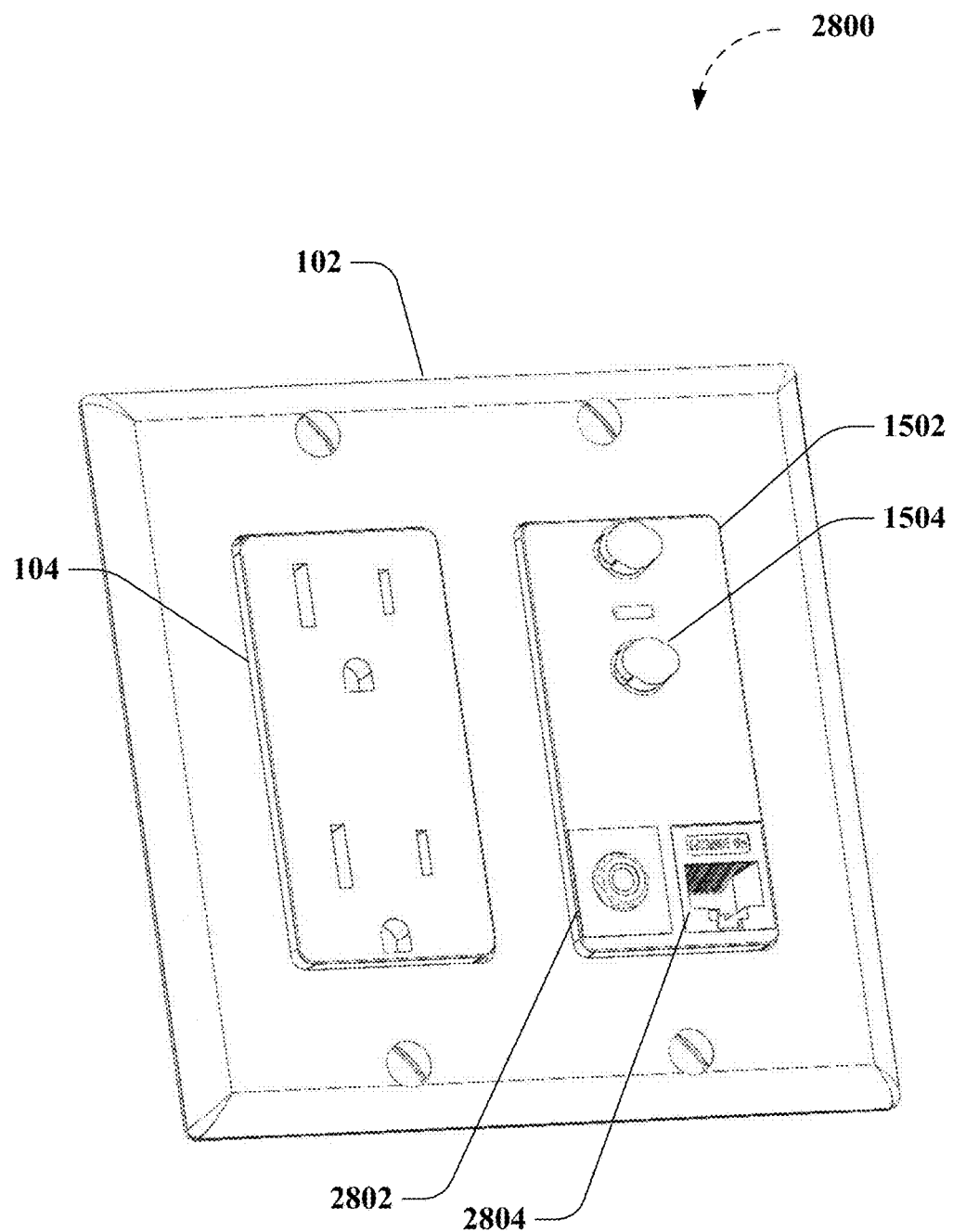

As can be seen in FIGS. 27-28, a variety of connector(s) types 2700 and/or configuration(s) (e.g., standardized inserts) can be employed in a connector station of the set of connector stations 2604, for example, from blank connector configurations (e.g., blank or blanking inserts) 2702 to audio, video, copper, optical, and other advanced connector(s) types and/or configuration(s) (e.g., connector inserts) such as CAT 6A, and so on (e.g., one or more of S-video adapter 2704, F-connectors 2706, 2720, binding post connector 2708, banana jack connector 2710, 3.5 millimeter (mm) QuickPort® stereo adapter 2712, 2802, RCA connectors 2714-2718, B and C connector 2722, network connectors 2724-2734, 2804, or otherwise, etc.). It can be understood that any of the variety of connectors or inserts depicted in FIG. 27, as well as FIGS. 28-31 can feature standard QuickPort® connector station compatibility for nearly limitless flexibility in connections and combinations of connections associated with the various embodiments as described herein.

Figure 29:
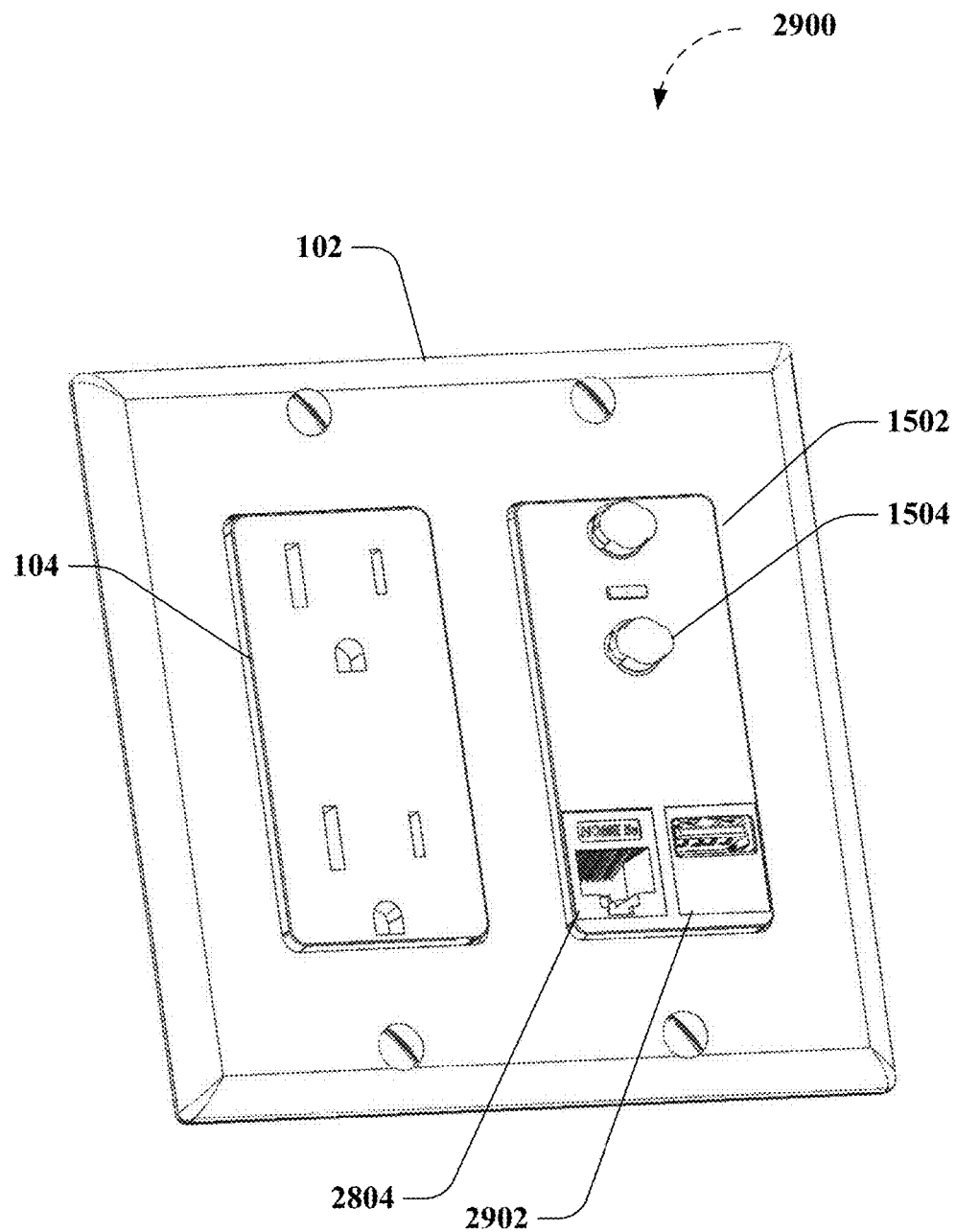
Figure 30:
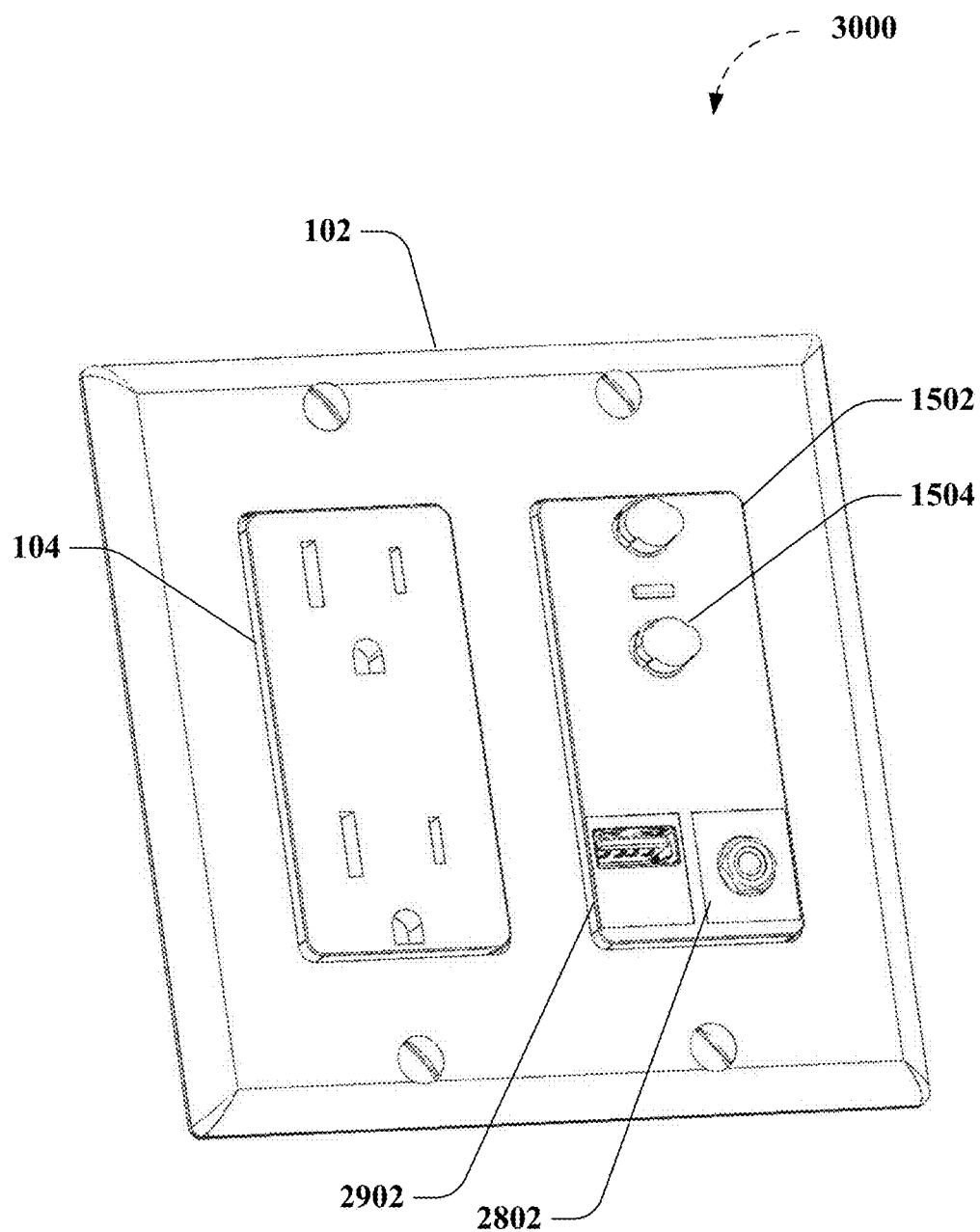
Figure 31:
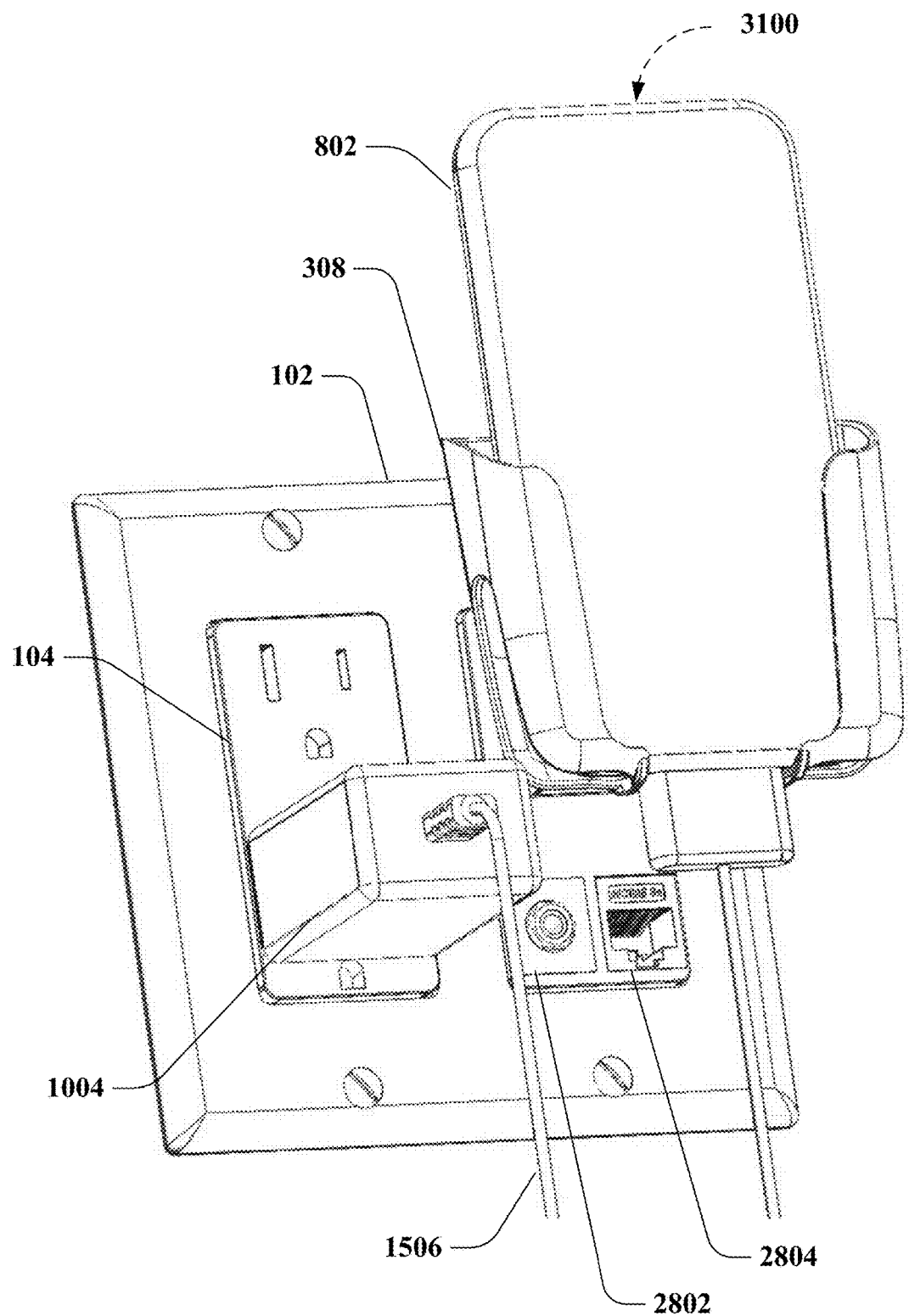
Figure 32:
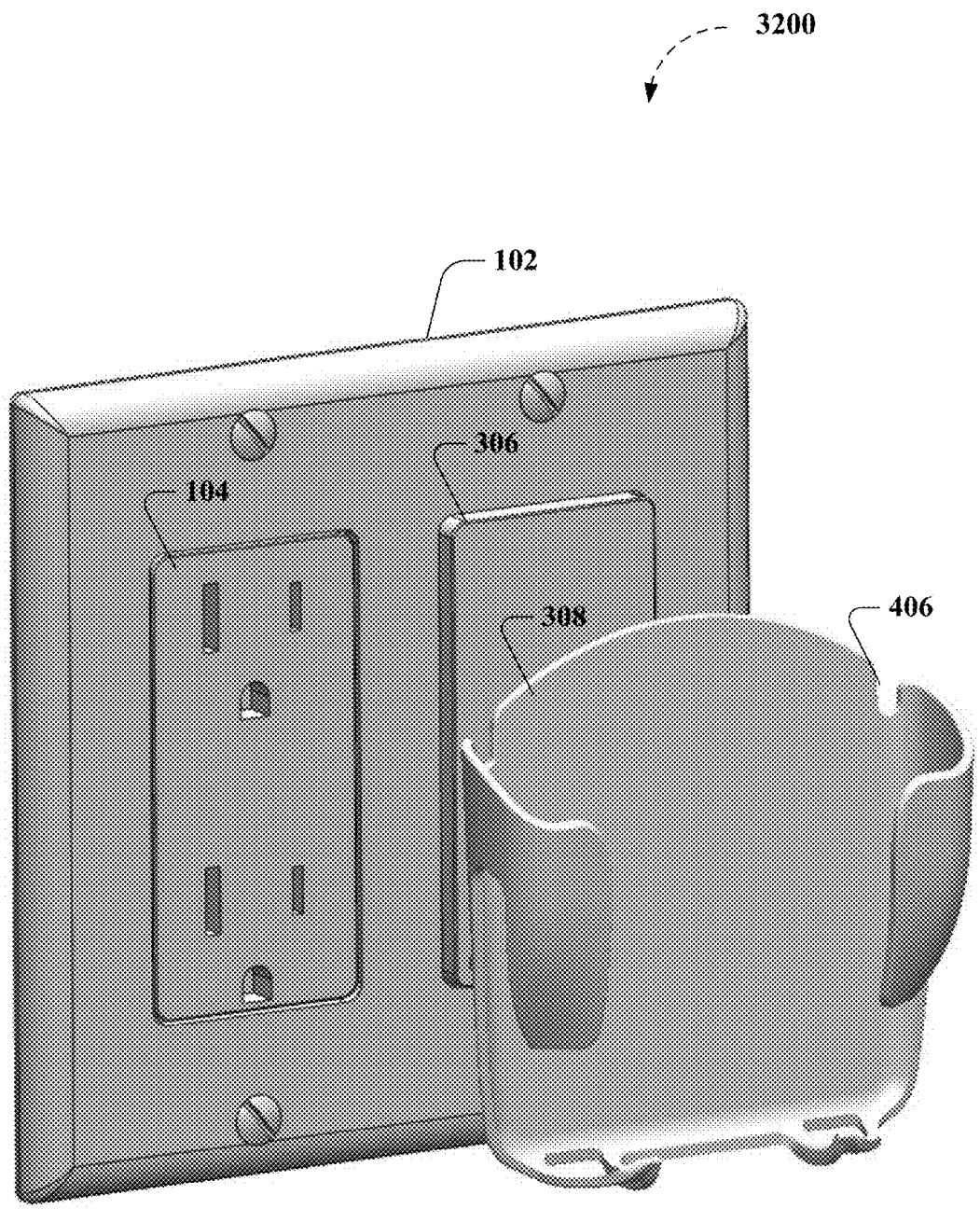
Figure 33:
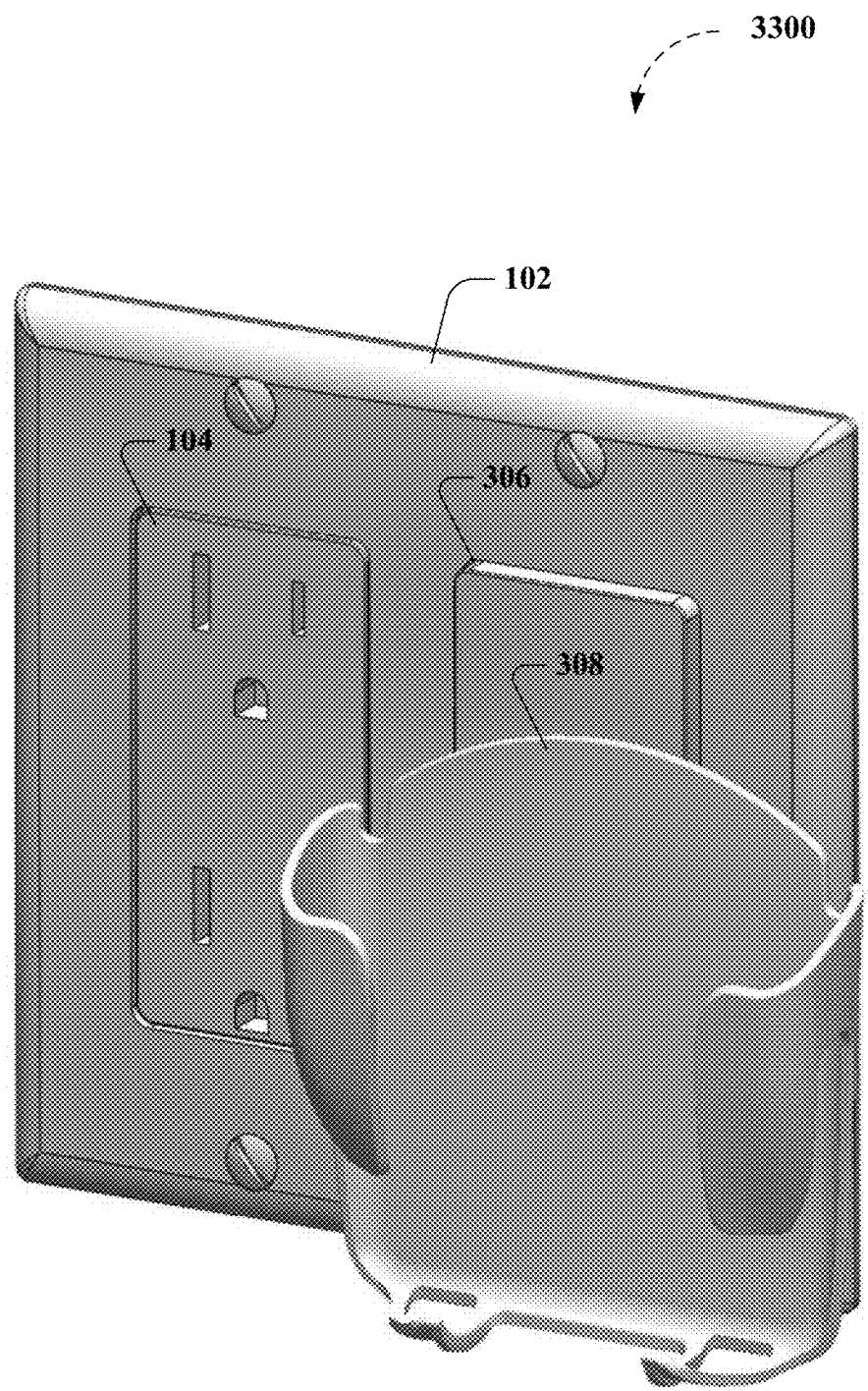
Figure 34:
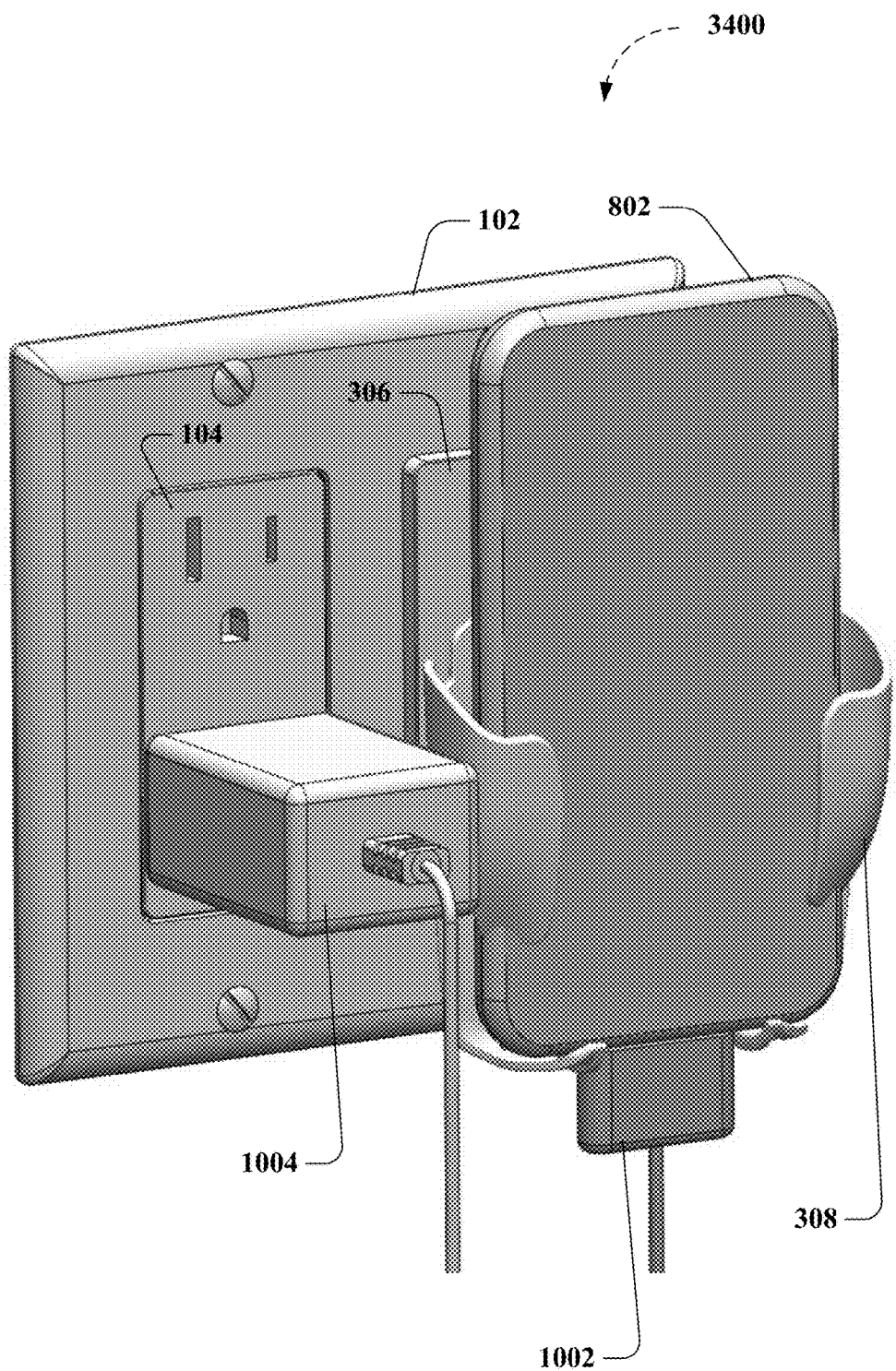
Figure 35:
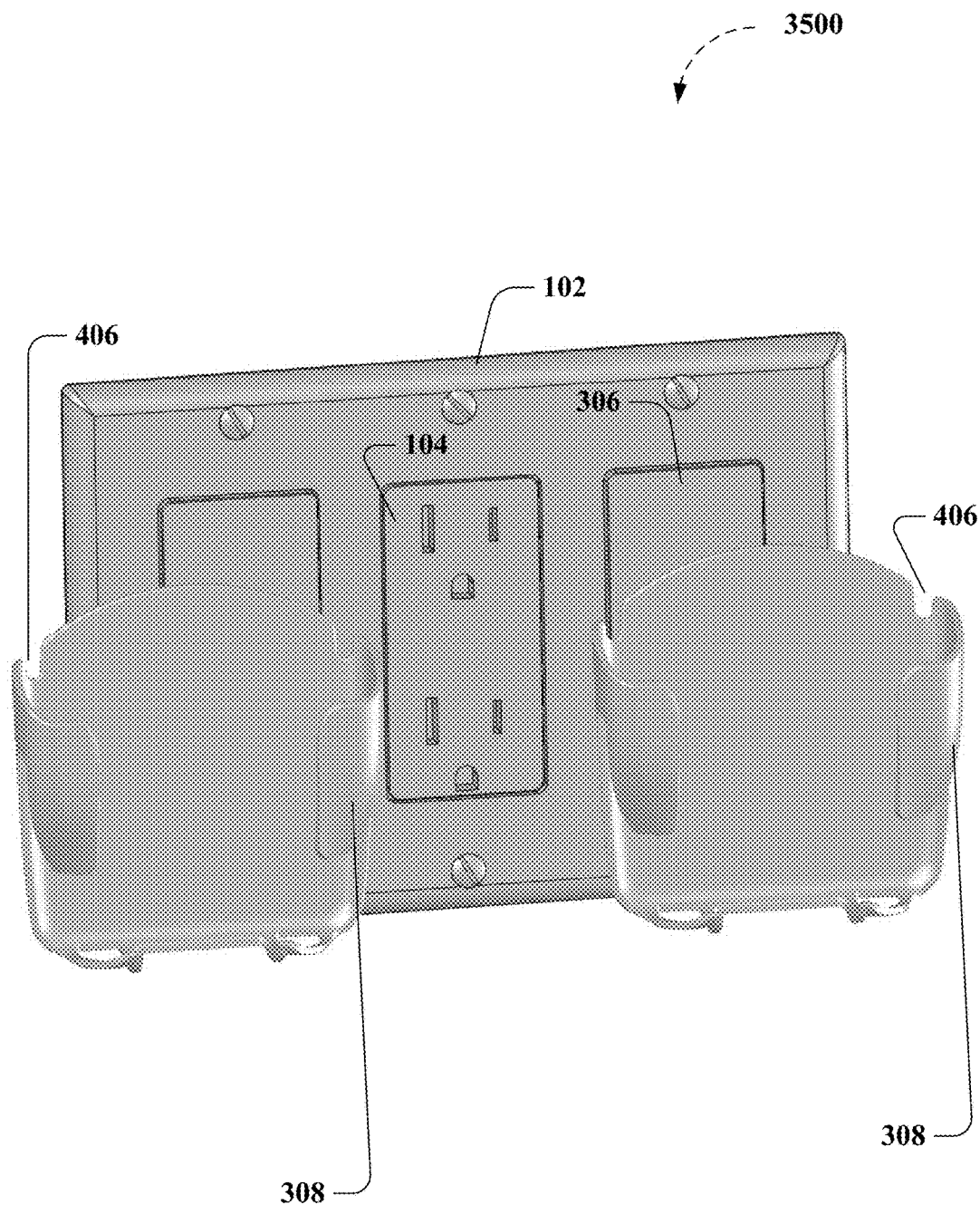
Figure 36:
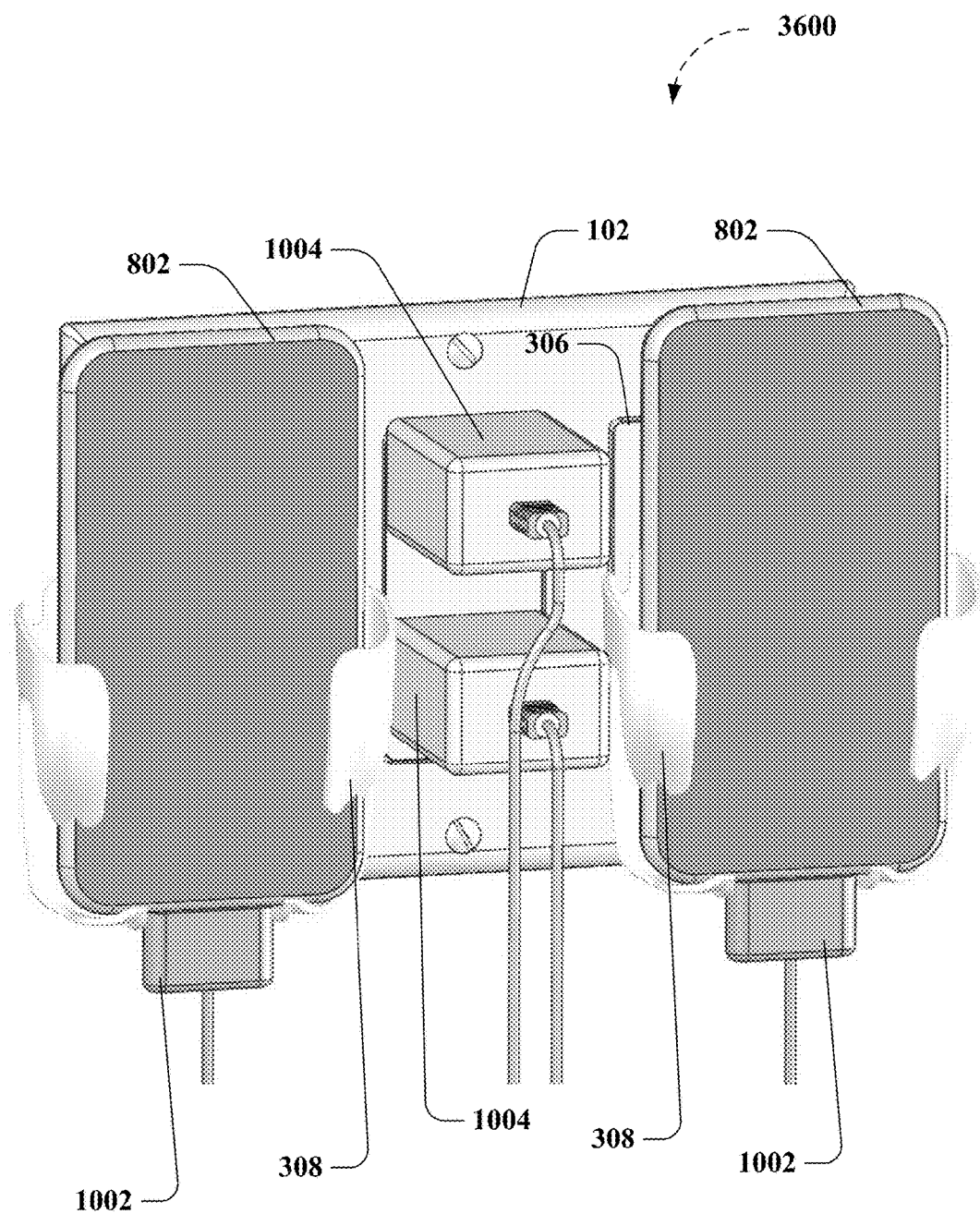

For example, FIGS. 28-31 depict various non-limiting implementations of a back plate or strap 2602 employing a variety of inserts and/or combinations thereof. For example, while FIG. 28 depicts an exemplary back plate or strap 2602 employing a combination of a 3.5 millimeter (mm) QuickPort® Stereo Adapter insert 2802 with a CAT 5e insert 2804, FIG. 29 depicts an exemplary back plate or strap 2602 employing a combination of a USB port insert 2092 with a CAT 5e insert 2804 insert. Note that, as described above regarding FIGS. 15-16, for example, various embodiments of the disclosed subject matter can comprise electronics and/or connectors, such as converters, for example, adapted to convert line voltage (e.g., United States standard 60 Hz 120 VAC line voltage, other standard line voltage, etc.) to a USB standard voltage (e.g., +5 Volts DC, or other standard peripheral connection standard voltage, etc.) to facilitate one or more of connecting or charging an electronic device. Thus, it can be understood that, whereas FIGS. 24-25 and 29-30 depict a back plate or strap comprising a connector that facilitates connecting a USB plug and cable of an associated electronic device, the disclosed embodiments can further comprise electronics such as one or more of a transformer, rectifier, converter, etc. and connectors that facilitate connecting alternating current line voltage to the electronics and converting the alternating current line voltage to a USB standard voltage (e.g., +5 Volts DC, or other standard peripheral connection standard voltage, etc.) to facilitate one or more of connecting or charging an electronic device.

For purposes of illustration and not limitation, the straps or back plates (e.g., back plate or strap 2602, and so on, etc.) have been shown having a set of two connector stations 2604 adapted to accept one of a multitude of variations of connector(s) types 2700 and/or configuration(s) (e.g., standardized inserts), shown having particular combinations of connector(s) types and/or configuration(s) (e.g., standardized inserts), or shown having a particular physical arrangement of connector stations (e.g., a 1×2 matrix of connector stations 2604 located on a bottom edge of the back plate or strap 2602), it can be understood that the various disclosed embodiments are not so limited. It can be further understood that the term "standardized" in reference to the terms "standardized insert" and "standardized form-factor" are intended to refer to the characteristic that a number of inserts can share some similarities in physical dimensions that facilitate installation of the inserts in connector stations having complementary physical dimensions (e.g., are of a standardized form-factor). Thus, in that context, it should be understood that the use of such terms does not necessarily connote acceptance and use by a particular standards-governing body nor does the use of such terms necessarily exclude such connotations.

FIGS. 32-36 depict still further non-limiting implementations that demonstrate additional aspects of the disclosed subject matter. For instance, FIGS. 32-36 depict other non-limiting implementations of a device cradle (e.g., device cradle (308), and so on, etc.) suitable for use in various embodiments, according to further aspects of the disclosed subject matter. As a further non-limiting example, device cradle 308 depicted in FIGS. 32-36 can be further configured with a cable management portion (e.g., cable management portion 406, and so on, etc.) adapted to manage or retain one or more of a power cable, a data cable, and/or a signal carrying cable associated with the electronic device, for instance. In still other non-limiting implementations, the second attachment mechanism can comprise other attachment mechanisms (e.g., other attachment mechanisms than those described above regarding FIG. 4, for example). For instance, variations in the one or more second attachment mechanism(s) can comprise one or more of omni-directional, flexible, sliding, and/or rotating second attachment mechanism(s), or other suitable variants of the second attachment mechanism(s). That is, variations of the one or more second attachment mechanism(s) can enable the device cradle (e.g., device cradle (304, 308), and so on, etc.) to be installed on the strap or back plate (302, 306, and so on, etc.) in an orientation that is rotated, slid, and/or otherwise moveably affixed (e.g., second attachment mechanism that facilitates device cradle attachment and support and flexibility in positioning of the device cradle relative to the strap or back plate (302, 306, and so on, etc.) or other structures and/or devices associated with wallplate 102, etc.) thereby allowing the device cradle (e.g., device cradle (304, 308), and so on, etc.) to accommodate other structures and/or devices associated with wallplate 102, such as receptacle 104, chargers, other device cradles, devices, for example.

In view of the structures and devices described supra, methods that can be implemented in accordance with the disclosed subject matter are described herein. While, for purposes of simplicity of explanation, the methods can be shown and described as a series of blocks, it is to be understood and appreciated that such illustrations or corresponding descriptions are not limited by the order of the blocks or recitation of the steps, as some blocks or steps may occur in different orders and/or concurrently with other blocks or steps from what is depicted and described herein. Any non-sequential, or branched flow illustrated via a flowchart should be understood to indicate that various other branches, flow paths, and orders of the blocks, can be implemented which achieve the same or a similar result. Moreover, not all illustrated blocks, if any, may be required to implement the methods described hereinafter.

Exemplary Methods

Figure 37:
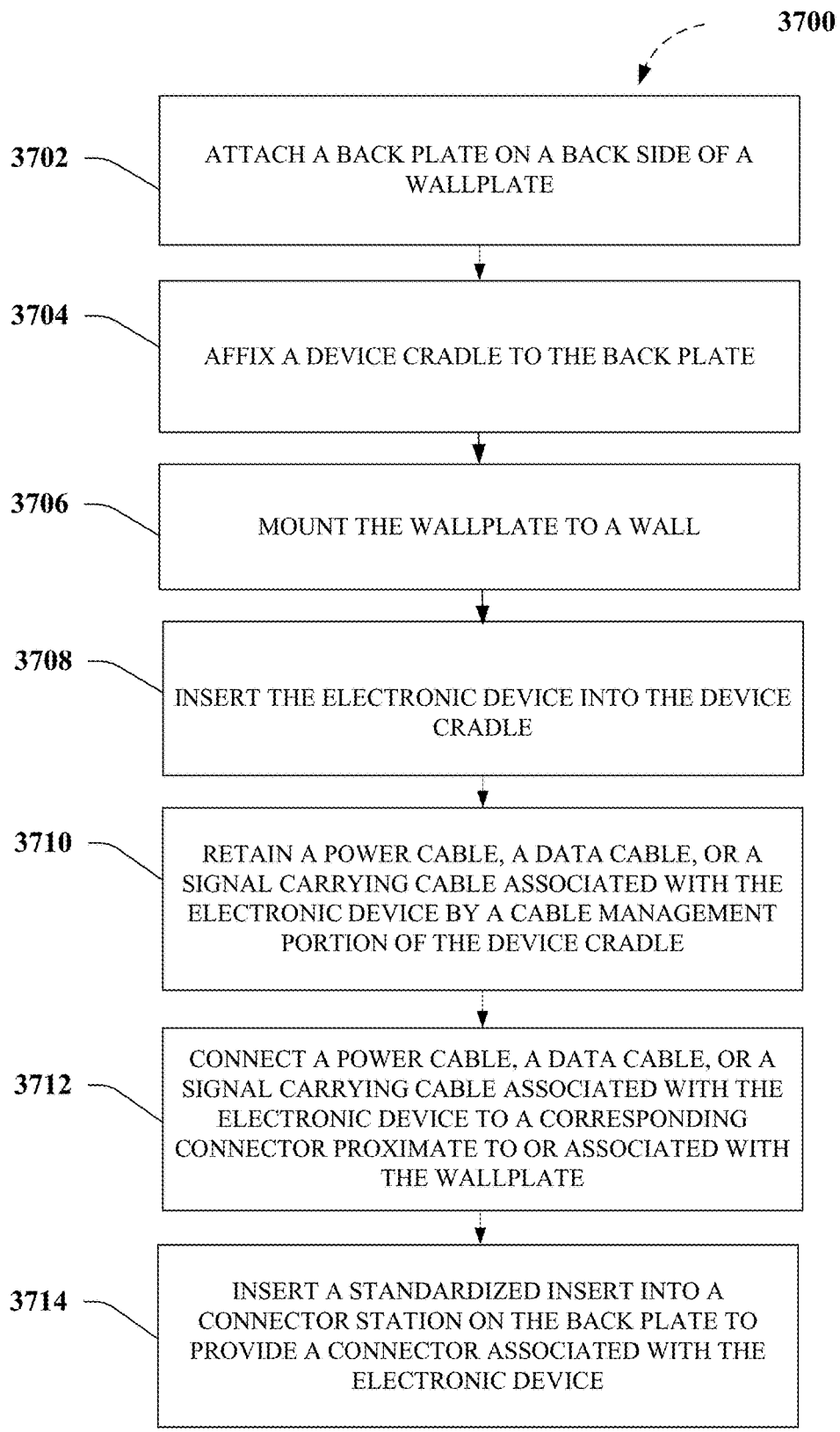
FIGS. 37-38 illustrate exemplary non-limiting flow diagrams of methods for performing aspects of embodiments of the disclosed subject matter.
Figure 38:
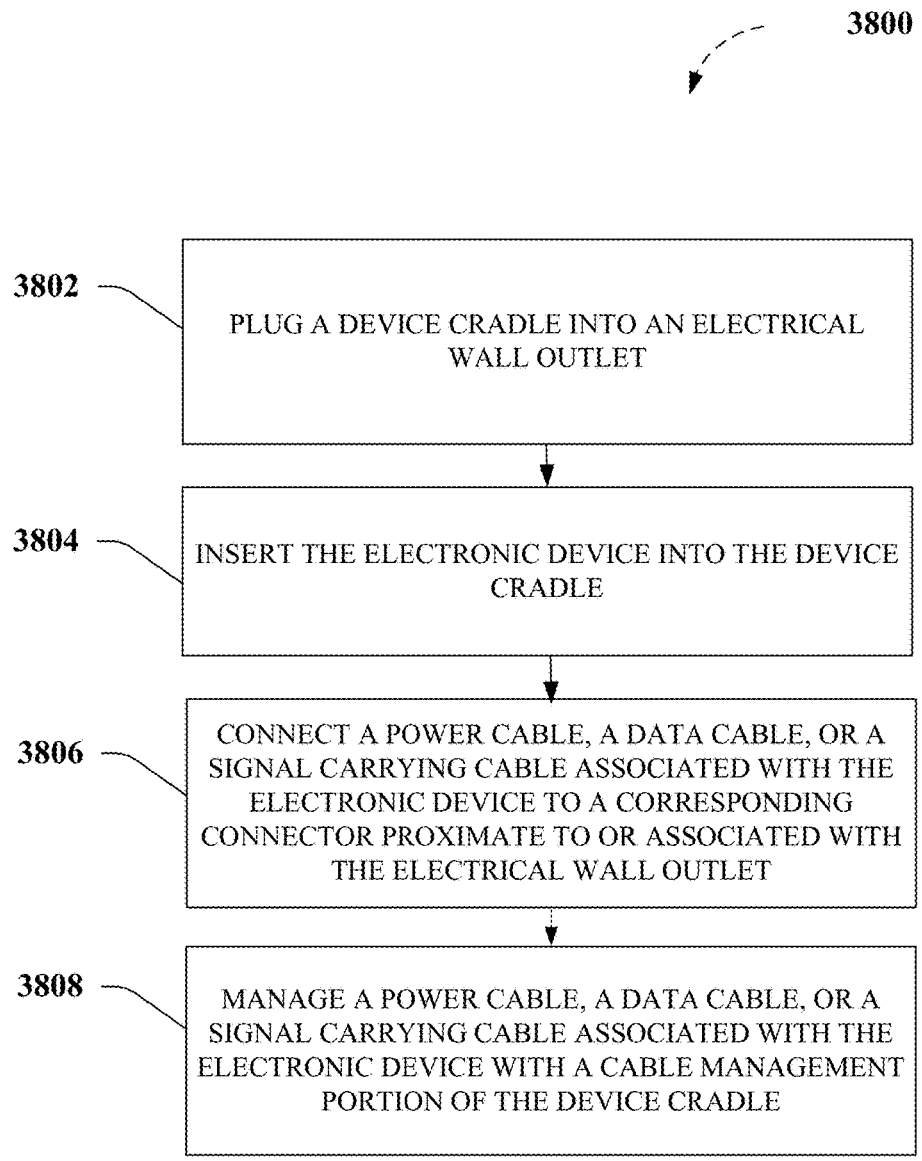

FIGS. 37-38 illustrate exemplary non-limiting flow diagrams of methods for performing aspects of embodiments of the disclosed subject matter. For instance, exemplary non-limiting methods 3700 for holding an electronic device (e.g., such as device 802, etc.) can comprise, at 3702, attaching a back plate or a strap (e.g., strap or back plate (302, 306, 1502, 2602), and so on, etc.) on a back side of a wallplate 102. Further non-limiting implementations of methods 3700 can also comprise, at 3704, affixing a device cradle (e.g., device cradle (304, 308), and so on, etc.) to the back plate or strap (e.g., strap or back plate (302, 306, 1502, 2602), and so on, etc.). In still other non-limiting implementations, methods 3700 can include mounting the wallplate 102 to a wall or other mounting surface, at 3706, as further described herein. In addition, method 3700, according to further non-limiting aspects, can also include inserting the electronic device into the device cradle (e.g., device cradle (304, 308), and so on, etc.), at 3708. In non-limiting examples, mounting the wallplate 102 to the wall or other mounting surface, a 3706, can include attaching the wallplate 102 to a junction box located or installed in the wall and having at least one fewer stations than the wallplate 102, as described above. In other non-limiting implementations, mounting the wallplate 102 to the wall or other mounting surface can also include mounting the wallplate 102 directly to a wall or other mounting surface without attaching the wallplate 102 to a junction box located or installed in the wall or other mounting surface, as described herein.

In addition, exemplary non-limiting methods 3700 can further comprise, and 3710, managing and/or retaining one or more of a power cable, a data cable, or a signal carrying cable associated with the electronic device into a cable management portion of the device cradle (e.g., device cradle (304, 308), and so on, etc.). Furthermore, exemplary methods 3700, at 3712, can further comprise connecting one or more of a power cable, a data cable, or a signal carrying cable associated with the electronic device to a corresponding connector that can be proximate to or associated with the wallplate 102, as further described herein. Additionally, exemplary methods 3700 can further comprise removing the device cradle (e.g., device cradle (304, 308), and so on, etc.) from the back plate or strap (e.g., strap or back plate (302, 306, 1502, 2602), and so on, etc.) when the device cradle is not holding the electronic device, as well as comprising, and 3714, inserting a standardized insert into a connector station that conforms to a standardized form-factor of a set of connector stations (e.g., such as connector station 2604, etc.) on the back plate or strap (e.g., strap or back plate (302, 306, 1502, 2602), and so on, etc.) to provide a connector associated with the electronic device, as further described above regarding FIGS. 26-28, for example.

In yet other exemplary implementations, methods 3800 for holding an electronic device (e.g., such as device 802, etc.) can comprise plugging a device cradle (e.g., device cradle (2302), and so on, etc.) into an electrical wall outlet, at 3802. Further exemplary implementations of methods 3800 can also comprise, at 3804, inserting the electronic device into the device cradle (e.g., device cradle (2302), and so on, etc.). In still other non-limiting implementations, methods 3800 can also comprise connecting one or more of a power cable, a data cable, or a signal carrying cable associated with the electronic device to a corresponding connector that can be proximate to or associated with the electrical wall outlet, a 3806, as further described herein. For instance, in exemplary methods, plugging a device cradle methods 3800 into an electrical wall outlet (e.g., such as receptacle 104, etc.) can include plugging electronics and connectors, such as converters, for example, adapted to convert line voltage to a USB standard voltage or other peripheral connection standard, to facilitate one or more of connecting or charging an electronic device, as further described herein, regarding FIG. 23, for example. In addition, exemplary methods 3800 can further comprise retaining or managing one or more of a power cable, a data cable, or a signal carrying cable associated with the electronic device with a cable management portion of the device cradle (e.g., device cradle (2302), as further described above.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

In addition, the words "exemplary" and "non-limiting" are used herein to mean serving as an example, instance, or illustration. For the avoidance of doubt, the subject matter disclosed herein is not limited by such examples. Moreover, any aspect or design described herein as "an example," "an illustration," "exemplary" and/or "non-limiting" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

While the disclosed subject matter has been described in connection with the various embodiments of the various figures, it is to be understood that other similar embodiments may be used with, or modifications and additions may be made to, the described embodiments for performing the same function of the disclosed subject matter without deviating therefrom. For example, one skilled in the art will recognize that aspects of the disclosed subject matter as described in the various embodiments of the present application may apply to other electronic devices or controls either handheld or otherwise.

As a further example, variations of process parameters or implementation details (e.g., dimensions, configurations, number of parts or components, aggregation of parts or components, devices and controls arrangements, joining, affixing, fastening, and/or attachment mechanisms, process step timing and order, addition and/or deletion of process steps, addition of preprocess and/or post-process steps, etc.) can be made to further optimize the provided structures, devices and methods, as shown and described herein. In any event, the structures and devices, as well as the associated methods, described herein have many applications in home automation and entertainment employing electronic devices. Therefore, the disclosed subject matter should not be limited to any single embodiment described herein, but rather should be construed in breadth and scope in accordance with the appended claims.

What is claimed is:

1. A system comprising:
a wallplate having a station;
a device cradle comprising at least one slot on a rear surface of the device cradle;
a strap that fits on a back side of the wallplate covering the station, the strap comprising a raised section having disposed thereon at least one peg, wherein the raised section has a shape that is complementary to the station; and
an attachment mechanism that attaches the strap to the back side of the wallplate,
wherein the at least one peg attaches the device cradle to the strap via interaction with the at least one slot, and
wherein the attachment mechanism aligns the strap to cause the raised section to protrude through the station of the wallplate.

2. The system of claim 1, wherein the attachment mechanism comprises at least one threaded hole adapted to accept a fastener inserted through the wallplate.

3. The system of claim 1, wherein the attachment mechanism comprises a raised attachment portion of the strap adapted to insert into a recessed mating portion of the wallplate.

4. The system of claim 1, further comprising a converter adapted to convert line voltage to a Universal Serial Bus (USB) standard voltage to facilitate charging an electronic device.

5. The system of claim 1, wherein the strap further comprises connector stations that conform to a standardized form-factor, and wherein the connector stations are adapted to accept a standardized data connector insert.

6. The system of claim 1, wherein the at least one peg allows attachment and removal of the device cradle.

7. The system of claim 1, wherein the device cradle further comprises a cable management portion adapted to retain at least one of a power cable, a data cable, or a signal carrying cable of an electronic device while the electronic device is installed in the device cradle.

8. A system, comprising:
a wallplate comprising a station;
a device cradle; and
a back plate that fits on a back side of the wallplate over the station, and fastens to the back side of the wallplate resulting in a fastened back plate,
wherein the back plate comprises a raised section having a shape that is complementary to the station and one or more pegs disposed on the raised section that project through the station while the back plate is fastened to the wallplate, and
wherein the one or more pegs lock into corresponding one or more slots on a rear surface of the device cradle while the device cradle is positioned on a front side of the wall plate.

9. The system of claim 8, wherein the back plate allows the wallplate and the fastened back plate to be mounted flush with a plane of a mounting surface absent a junction box to accommodate the back plate.

10. The system of claim 8, further comprising electronics and at least one connector adapted to convert line voltage to a Universal Serial Bus (USB) standard voltage to facilitate at least one of connecting or charging an electronic device.

11. The system of claim 8, wherein the one or more pegs and the corresponding one or more slots allow removably attaching the device cradle to the back plate.

12. The system of claim 8, wherein the back plate comprises at least one threaded hole adapted to accept a fastener inserted through the wallplate to facilitate fitting the back plate on the back side of the wallplate.

13. The system of claim 8, wherein the back plate comprises a raised attachment portion adapted to insert into a corresponding recessed portion of the wallplate to facilitate fitting the back plate on the back side of the wallplate.

14. The system of claim 8, wherein the back plate comprises at least one recessed portion adapted to receive a corresponding at least one raised attachment portion of the wallplate to facilitate fitting the back plate on the back side of the wallplate.

15. The system of claim 8, wherein the device cradle comprises a cable management portion adapted to retain at least one of a power cable, a data cable, or a signal carrying cable of an electronic device while the electronic device is installed in the device cradle.

16. A system, comprising:
a wallplate having at least two stations;
a device cradle that holds an electronic device proximate at least one of an electrical outlet, a switch, or a control device mounted in a first station of the at least two stations and adapted to manage at least one of a power cable, a data cable, or a signal carrying cable associated with the electronic device; and a strap that attaches over a second station of the at least two stations from a back side of the wallplate, the strap comprising a raised surface having a shape that is complementary to the second station and further comprising at least one peg located on the raised surface, wherein the device cradle comprises at least one slot that attaches to the at least one peg of the strap, and wherein the raised surface fits within the second station while the strap is attached to the wallplate.

17. The system of claim 16, further comprising electronics and at least one connector adapted to convert line voltage to a Universal Serial Bus (USB) standard voltage to facilitate at least one of connecting or charging an electronic device.

18. The system of claim 16, wherein the strap comprises at least one connector station adapted to accept at least one of a blank insert or a connector insert.

19. The system of claim 16, wherein the strap comprises at least one threaded hole adapted to accept a fastener inserted through the wallplate to facilitate attachment of the strap to the wallplate.

20. The system of claim 16, wherein the strap comprises at least one raised attachment portion adapted to insert into a corresponding at least one recessed portion of the wallplate to facilitate attachment of the strap to the wallplate.

21. The system of claim 16, wherein the strap comprises at least one recessed portion adapted to receive a corresponding at least one raised attachment portion of the wallplate to facilitate attachment of the strap to the wallplate.

22. A method, comprising:
attaching a back plate on a back side of a wallplate, the back plate comprising a raised surface having disposed thereon one or more pegs, wherein the raised surface has a shape that is complementary to a station of the wallplate and wherein the attaching causes the raised surface to project through the station of the wallplate;
affixing one or more slots located on a rear surface of a device cradle to the one or more pegs of the back plate;
mounting the wallplate to a wall; and
inserting the electronic device into the device cradle.

23. The method of claim 22, further comprising:
retaining at least one of a power cable, a data cable, or a signal carrying cable associated with the electronic device by a cable management portion of the device cradle.

24. The method of claim 22, further comprising:
connecting at least one of a power cable, a data cable, or a signal carrying cable associated with the electronic device to a corresponding connector, wherein the corresponding connector is at least one of proximate to or associated with the wallplate.

25. The method of claim 22, wherein the mounting the wallplate to the wall comprises attaching the wallplate to a junction box located in the wall and having at least one fewer station than the wallplate.

26. The method of claim 22, wherein the mounting the wallplate to the wall comprises mounting the wallplate directly to the wall without attaching the wallplate to an existing junction box located in the wall.

27. The method of claim 22, further comprising:
removing the device cradle from the back plate while the device cradle is not holding the electronic device.

28. The method of claim 22, further comprising:
inserting a standardized insert into a connector station of a set of connector stations on the back plate to provide a connector associated with the electronic device, wherein the connector station conforms to a standardized form factor.

29. The method of claim 22, wherein the attaching comprises inserting a threaded fastener through a hole in the wallplate and a threaded hole in the back plate.

30. The method of claim 22, wherein the attaching comprises inserting a raised attachment portion on the back plate into a corresponding recessed portion on the back side of the wallplate.

31. A system for holding an electronic device comprising:
a wallplate comprising one or more stations;
a back plate that fastens to a rear side of the wallplate and comprises at least one peg that protrudes through an unused station of the one or more stations while the back plate is fastened to the rear side of the wallplate, wherein the at least one peg is disposed on a raised portion of the back plate having a shape that is complementary to the unused station; and
a device cradle that attaches to the back plate on a front side of the wallplate, the device cradle comprising at least one slot that connects to the at least one peg.

32. The system of claim 31, wherein the device cradle is removable from the back plate.

33. The system of claim 31, wherein the device cradle further comprises a cable management portion adapted to retain at least one of a power cable, a data cable, or a signal carrying cable associated with the electronic device.

34. The system of claim 31, wherein the device cradle allows passage of at least one of a power cable, a data cable, or a signal carrying cable attached to the electronic device while the electronic device is inserted into the device cradle.

35. The system of claim 31, further comprising electronics and one or more connectors adapted to convert line voltage to a Universal Serial Bus (USB) standard voltage to facilitate at least one of connecting or charging the electronic device.

36. The system of claim 31, wherein the back plate mounts substantially flush to a mounting surface for the wallplate absent an available station in a junction box installed in the mounting surface or absent an available junction box in the mounting surface.

37. The system of claim 31, wherein the back plate further comprises connector stations that conform to a standardized form-factor, and wherein the connector stations are adapted to accept a removable data connector.

* * * * *